(12) United States Patent
Minskoff

(10) Patent No.: US 11,107,370 B2
(45) Date of Patent: Aug. 31, 2021

(54) RESPIRATORY SYSTEM SIMULATOR

(71) Applicant: InnovoSciences, LLC, Ridgefield, CT (US)

(72) Inventor: Noah Mark Minskoff, Palo Alto, CA (US)

(73) Assignee: Michael Edward Breede, Ridgefield, CT (US)

( * ) Notice: Subject to any disclaimer, the term of this patent is extended or adjusted under 35 U.S.C. 154(b) by 861 days.

(21) Appl. No.: 15/004,865

(22) Filed: Jan. 22, 2016

(65) Prior Publication Data

US 2016/0217709 A1   Jul. 28, 2016

Related U.S. Application Data

(60) Provisional application No. 62/107,374, filed on Jan. 24, 2015, provisional application No. 62/245,817, filed on Oct. 23, 2015.

(51) Int. Cl.
*G09B 23/30* (2006.01)

(52) U.S. Cl.
CPC .................. *G09B 23/30* (2013.01)

(58) Field of Classification Search
CPC .................................................. G09B 23/30
USPC ...................................................... 434/267
See application file for complete search history.

(56) References Cited

U.S. PATENT DOCUMENTS

| 3,954,920 | A | | 5/1976 | Heath | |
|---|---|---|---|---|---|
| 4,334,533 | A | * | 6/1982 | Henkin | ............ A61M 16/0045 128/205.28 |
| 5,584,701 | A | | 12/1996 | Lampotang et al. | |
| 5,785,051 | A | * | 7/1998 | Lipscher | ................. A61B 5/06 128/200.26 |

(Continued)

OTHER PUBLICATIONS

PCT/US2016/014638 International Search Report and Written Opinion dated Mar. 24, 2016.

*Primary Examiner* — Eugene L Kim
*Assistant Examiner* — Dolores R Collins
(74) *Attorney, Agent, or Firm* — Durham Jones & Pinegar, P.C., Intellectual Property Law Group

(57) ABSTRACT

An apparatus that simulates a respiratory system for characterizing particle delivery within lungs by an inhaler within lungs is shown and described. The respiratory system simulator comprises a simulated oral cavity to receive an aerosol, a simulated oropharynx cavity, a simulated lung airway system, and a breath simulator. The simulated oral cavity is configured to receive a flow of particles and direct the flow to the simulated oropharynx cavity. The simulated oropharynx cavity is configured to receive a flow from the simulated oral cavity and direct the flow to a simulated trachea cavity. The simulated trachea cavity directs the flow to the simulated lung airway system. The simulated lung airway system comprises a plurality of bronchial airway generations simulating bronchial airway generations of a lung or lungs. The respiratory system simulator may be maintained at or near humidity and temperature levels within a respiratory system.

(Continued)

The breath simulator interface is in fluid communication with the rest of the respiratory system simulator and configured to control a flow through the simulated oropharynx cavity, the simulated trachea airway cavity, and the simulated lung airway system.

20 Claims, 26 Drawing Sheets

(56) References Cited

U.S. PATENT DOCUMENTS

| | | | | |
|---|---|---|---|---|
| 5,823,787 A * | 10/1998 | Gonzalez | ............... | G09B 23/28 434/265 |
| 6,874,501 B1 * | 4/2005 | Estetter | ............... | G09B 23/288 128/205.13 |
| 7,798,148 B2 * | 9/2010 | Doshi | ............... | A61M 15/08 128/200.24 |
| 7,806,120 B2 * | 10/2010 | Loomas | ............... | A61M 15/08 128/204.21 |
| 7,856,979 B2 * | 12/2010 | Doshi | ............... | A61M 15/08 128/200.26 |
| 7,959,443 B1 | 6/2011 | Frembgen et al. | | |
| 8,195,297 B2 * | 6/2012 | Penner | ............... | A61N 1/3601 607/42 |
| 8,348,673 B2 * | 1/2013 | Gerde | ............... | G09B 23/32 434/272 |
| 2004/0251318 A1 * | 12/2004 | Braithwaite | ........... | A61M 11/06 239/419.5 |
| 2007/0225587 A1 * | 9/2007 | Burnell | ............... | A61B 5/08 600/407 |
| 2008/0227073 A1 * | 9/2008 | Bardsley | ............... | G09B 23/30 434/267 |
| 2009/0036790 A1 * | 2/2009 | Landesberg | ........ | A61M 16/021 600/529 |
| 2014/0336159 A1 * | 11/2014 | Clarke | ............... | A61K 9/0075 514/171 |

* cited by examiner

RESPIRATORY SYSTEM SIMULATOR

CROSS-REFERENCE

This application claims the benefit of U.S. Provisional Application No. 62/107,374, filed Jan. 24, 2015, and U.S. Provisional Application No. 62/245,817, filed Oct. 23, 2015, which applications are incorporated herein by reference.

BACKGROUND

Aerosolized and/or vaporized particles are delivered to lungs of individuals through a number of different devices including, for example, devices that deliver inhalable medicaments to the lungs, or, for example, devices that deliver inhalable tobacco. An important factor in determining where particles deposit in the lungs is particle size. Particle size is generally measured in room temperature air. Hygroscopic particles will likely gain mass as they pass through the saturated air of the upper and lower respiratory tract.

SUMMARY

Described herein are devices, systems, and methods for providing a respiratory system simulator of a human or animal.

Conventional methods to characterize aerosols and powders may not account for the humidity and temperature of the mouth through to the lung. Hygroscopic particles may absorb water in the humid environment of the upper respiratory tract and grow larger. This growth could affect where the particles deposit in the lungs, making the existing characterization methods invalid.

The main factor that determines where particles deposit in the lungs is particle size. Particle size is generally measured in room temperature air. Hygroscopic particles will likely gain mass as they pass through the saturated air of the upper and lower respiratory tract. As a result, commonly used particle measurement methods may incorrectly characterize particle size. Incorrect estimation of particle size could lead to invalid conclusions about how deeply the particles penetrate the respiratory tract.

The region of the lung where particles of various sizes deposit has been studied using numerous in vivo and in vitro methods. There appears to be good body of work correlating particle size to where the particles deposit in the lung. The existing body of research can be leveraged once the size distribution has been determined. The Spraytec, manufactured by Malvern Instruments, characterizes particle size distribution using laser diffraction.

Research and modelling to date has indicated that the speed of the airflow through the lung is relatively constant through the trachea and the bronchi, up to the first few generations. The Reynold's number of this airflow is at most just over 1,000, indicating transitional laminar flow. The speed of the airflow slows as it passes into the bronchioles because the collective cross sectional area increases exponentially. By the 16th generation, the cross sectional area is 180 $cm^2$ and the Reynold's number is less than 1, indicating very slow laminar flow. The generations between the 16th generation and the alveolar sacs increase the cross sectional area to close to 1 $m^2$.

To simulate the increase in cross sectional area past the 16th generation would make a device very large and expensive and create difficulties collecting the particle stream passing through. In addition, the distance from the 16th generation to the alveolar sacs is less than 1 cm. A mechanical structure that increases in cross sectional area from 180 $cm^2$ to 1,000 $cm^2$ over a 1 cm path is likely not feasible at a reasonable cost. Because the airflow through this whole region of the lung is very slow and laminar, the described concept achieves good results limiting the cross sectional area to reasonable size while extending the path length to maintain the time spent in the humid environment.

The thermally regulated aerosol generator (TRAG) generates particles in the range of 0.1-10 µm. Because of the low Reynold's number in the lung, particle deposition is expected to be dominated by diffusion, not from falling out of the airflow as it changes direction. For this reason, following the exact branching structure of the lung may not be necessary.

The human airway simulator concept allows particle size measurement using a particle size analyzer after passing through the simulated respiratory tract.

Described herein is an apparatus that simulates a respiratory system, comprising a simulated oral cavity to receive an aerosol; a simulated oropharynx cavity to receive an aerosol from the simulated oral cavity; a simulated trachea airway cavity to receive the aerosol from the simulated oropharynx cavity; a simulated lung airway system comprising a plurality of bronchial airway generations, the simulated lung airway system to receive the aerosol from the simulated trachea airway cavity, the plurality of bronchial airway generations including a final airway generation; a breath simulator interface in fluid communication with the final airway generation, a breath simulator coupled to the breath simulator interface to draw the aerosol through the simulated oropharynx cavity, the simulated trachea airway cavity, and the simulated lung airway system. In some embodiments, at least one of the simulated oral cavity, the simulated oropharynx cavity, the simulated trachea airway cavity, and the simulated lung airway system is coated with a cavity lining. In some embodiments, the cavity lining comprises a growth medium suitable for growing microorganisms. In some embodiments, the simulated lung airway system comprises: a simulated upper lung airway system, the aerosol to be drawn from the simulated trachea airway cavity through the simulated upper lung airway system; and a simulated lower lung airway system, the simulated lower lung airway system including the final airway generation, the simulated lower lung airway system receiving the aerosol from the simulated upper lung airway system. In some embodiments, the lower lung airway system comprises a first perforated plate having a first plurality of passageways through the first perforated plate that simulate a first lower lung bronchial airway generation corresponding to the first perforated plate, the first plurality of passageways having sizes that simulate the first lower lung bronchial airway generation, and a second perforated plate having a second plurality of passageways through the second perforated plate that simulate a second lower lung bronchial airway generation corresponding to the second perforated plate, the second plurality of passageways having sizes that simulate the second lower lung bronchial airway generation. In some embodiments, the aerosol is drawn through the first plurality of passageways before being drawn through the second plurality of passageways, the second plurality of passageways being offset from the first plurality of passageways such that a flow of the aerosol from each exit of each of the first plurality of passageways is divided into a plurality of flows before entering each entrance of each of the second plurality of passageways. In some embodiments, a first cross-sectional area of each of the first plurality of passageways is greater than a second cross-sectional area of each of the second plurality of passageways. In some embodiments, the apparatus comprises an air gap between the first perforated plate and the second perforated plate, the air gap forming a space between the exits of each of the first plurality of passageways and the entrances of each of the second plurality of passageways.

Described herein is a modular apparatus that simulates a respiratory system, comprising: an oral cavity module having an oral cavity to draw a flow from outside the oral cavity that simulates an inhalation of a breath, the oral cavity having a first shape and first dimensions that simulate an oral cavity; an oropharynx module having an oropharynx cavity to receive the flow from the oral cavity module, the oropharynx module configured to be detachable from the oral cavity module, into the oropharynx module, the oropharynx cavity having a second shape and second dimensions that simulate an oral cavity and a pharyngeal cavity; a trachea module having a trachea airway cavity to receive the flow from the simulated oropharynx cavity, the trachea airway module configured to be detachable from the oropharynx module, the trachea airway cavity having a third shape and third dimensions that simulate a trachea cavity; an upper lung airway module having a first plurality of bronchial airway generation cavities to receive, and divide with each successive generation, the flow from the simulated trachea cavity, the upper lung airway module configured to be detachable from the trachea module; a lower lung airway module having a second plurality of bronchial airway generation cavities to receive, and divide with each successive generation, divided flows from the upper lung airway module, the lower lung airway module configured to be detachable from the upper lung airway module; and a sampling cavity module to receive the divided flows from the lower lung airway module, the sampling cavity module having a breath simulator interface to receive a negative pressure having a strength and a duration to simulate an inhalation cycle. In some embodiments, the sampling cavity module has sampling windows for an optical particle size analyzer to measure an aerosol droplet size in the flows from the lower lung airway module. In some embodiments, the sampling cavity module further comprises a humidity sensor port. In some embodiments, the apparatus comprises at least one temperature-controlled heating element to maintain the inner surface temperature of the oral cavity module, the oropharynx and the trachea module to simulate the oral cavity and the pharyngeal cavity. In some embodiments, the inner surface of at least one of the oral cavity module, the oropharynx module and the trachea module is coated with a cavity lining that simulates a wetness of the oral cavity and the pharyngeal cavity. In some embodiments, the upper lung airway module further comprises at least one temperature-controlled heating element to maintain an inner surface of the first plurality of bronchial airway generation cavities at a temperature that simulates a lung. In some embodiments, the inner surface of the first plurality of bronchial airway generation cavities are coated with a cavity lining that simulates a wetness of a lung. In some embodiments, the upper lung airway module further comprises at least one temperature-controlled heating element to maintain an inner surface of the first plurality of bronchial airway generation cavities at a temperature that simulates a lung. In some embodiments, the lower lung airway module further comprises at least one temperature-controlled heating element to maintain an inner surface of the first plurality of bronchial airway generation cavities at a temperature that simulates a lung. In some embodiments, the inner surface of the second plurality of bronchial airway generation cavities are coated with a cavity lining that simulates a wetness of a lung.

Described herein is a method of operating a modular respiratory system simulator, comprising: drawing a flow from outside of an oral cavity module having an oral cavity to draw a flow from outside the oral cavity that simulates an inhalation of a breath, the oral cavity having a first shape and first dimensions that simulate an oral cavity; receiving the flow in an oropharynx module from the oral cavity module, the oropharynx module having an oropharynx cavity to receive the flow from the oral cavity module, the oropharynx module configured to be detachable from the oral cavity module, into the oropharynx module, the oropharynx cavity having a second shape and second dimensions that simulate an oral cavity and a pharyngeal cavity; receiving the flow in a trachea module from the oropharynx module, the trachea module having a trachea airway cavity to receive the flow from the simulated oropharynx cavity, the trachea airway module configured to be detachable from the oropharynx module, the trachea airway cavity having a third shape and third dimensions that simulate a trachea cavity; receiving and dividing the flow in an upper lung airway module from the trachea module, the upper lung airway module having a first plurality of bronchial airway generation cavities to receive, and divide with each successive generation, the flow from the simulated trachea cavity, the upper lung airway module configured to be detachable from the trachea module; receiving and further dividing the divided flows in a lower lung airway module from the upper lung airway module, the lower lung airway module having at least a second plurality of bronchial airway generation cavities to receive and divide with each successive generation, divided flows from the upper lung airway module, the lower lung airway module configured to be detachable from the upper lung airway module; and receiving the divided flows in a sampling cavity from the lower lung airway module in a sampling cavity module, the sampling cavity module to receive the divided flows from the lower lung airway module, the sampling cavity module having a breath simulator interface to receive a negative pressure having a strength and a duration to simulate an inhalation cycle. In some embodiments, the method further comprises a cavity lining at least one of the oral cavity module, the oropharynx module, the trachea module, the upper lung module and the lower lung module with a cavity lining that simulates a wetness of the oral cavity, the pharyngeal cavity and the lungs.

BRIEF DESCRIPTION OF THE DRAWINGS

The novel features of the subject matter described herein are set forth with particularity in the appended claims. A better understanding of the features and advantages of the present subject matter will be obtained by reference to the following detailed description that sets forth illustrative embodiments, in which the principles of the subject matter described herein are utilized, and the accompanying drawings of which:

FIG. 1A is a diagram illustrating an inhaler and human respiratory system.

FIG. 1B is a diagram illustrating the operation of an inhaler with a human respiratory system.

FIG. 2 is a block diagram illustrating a respiratory system simulator.

FIG. 3 is a block diagram illustrating an oropharynx simulator.

FIG. 4 is a block diagram illustrating a trachea simulator.

FIG. 5A is a block diagram illustrating a lung simulator.

FIGS. 9A, 9B, 9C, and 9D respectively show side, rear, top, and oblique views of an embodiment of a lung simulator assembly.

Figure 10:
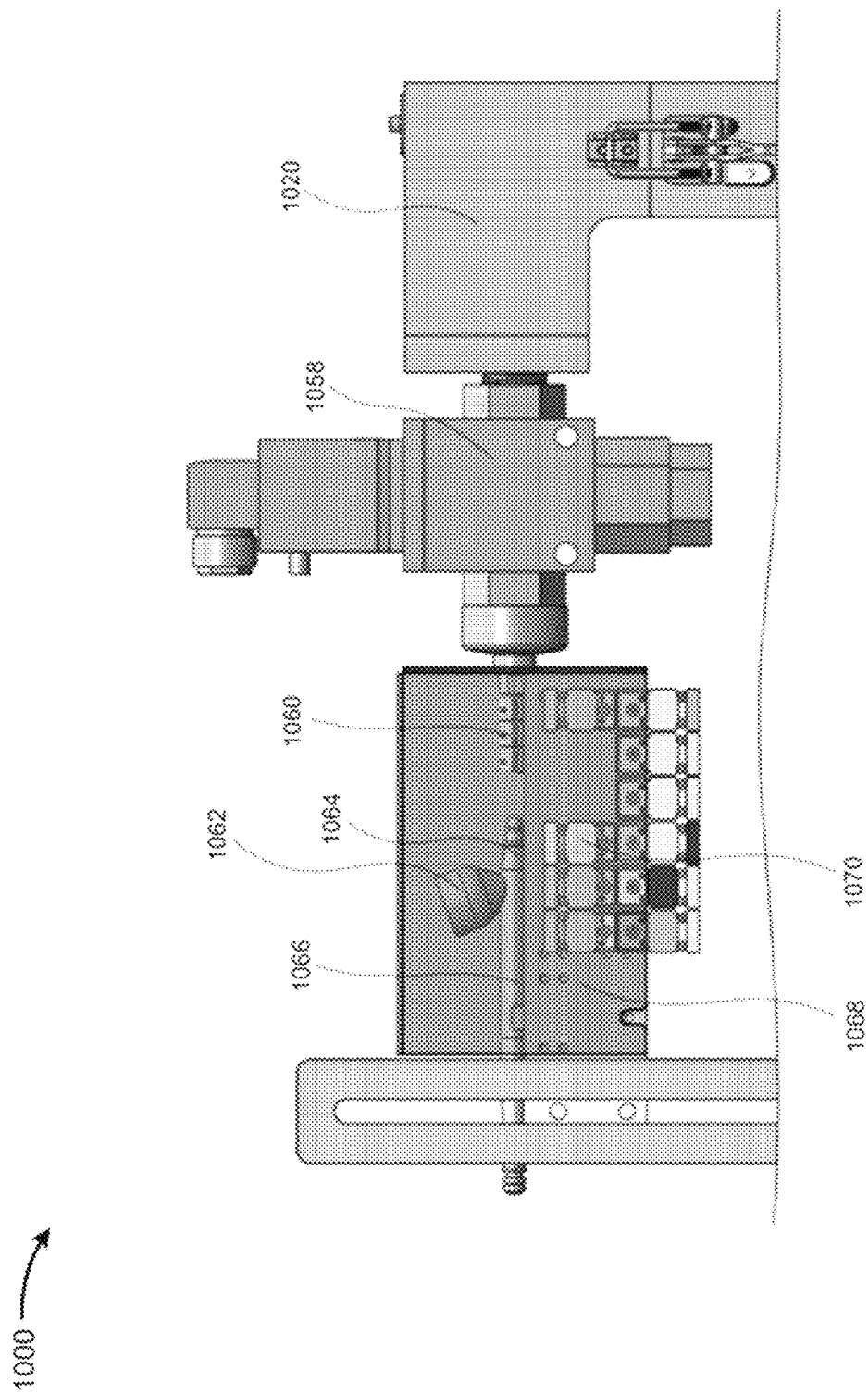

FIG. 10 shows a detailed view of an embodiment of an aerosol generator and mouth simulator.

Figure 11:
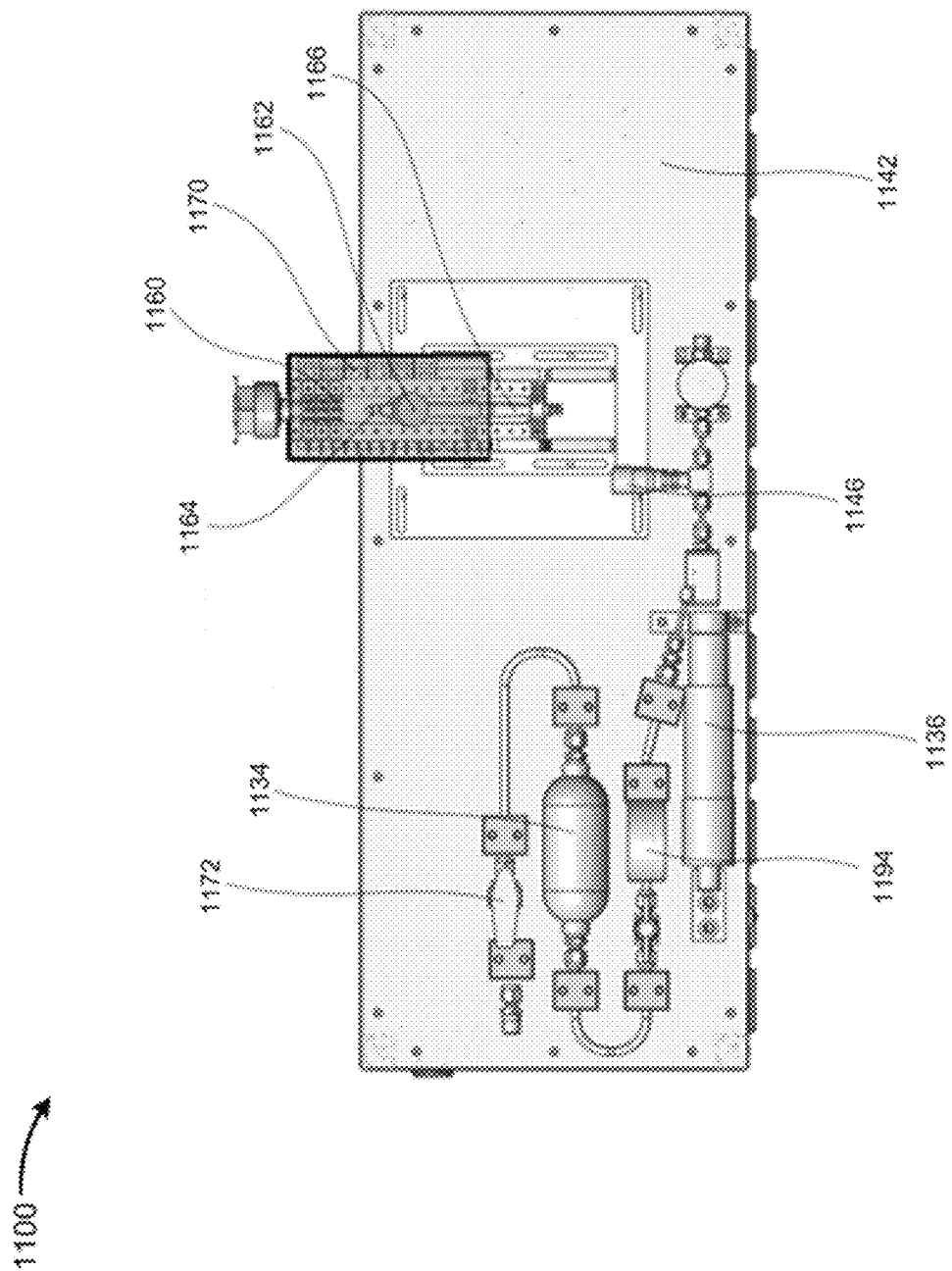

FIG. 11 shows a top detailed view of embodiments of the control platform and embodiments of components found thereon.

Figure 12:
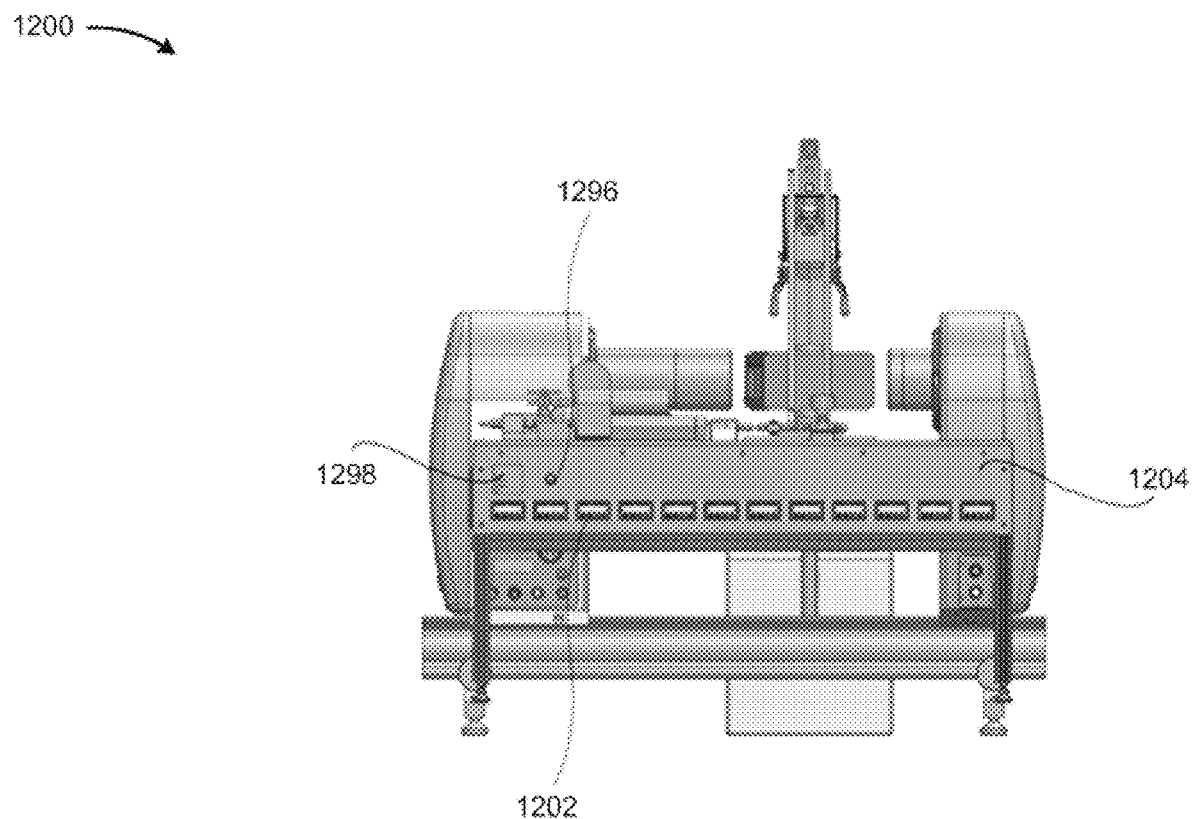

FIG. 12 shows a detailed view of the front the control element panel.

Figure 13:
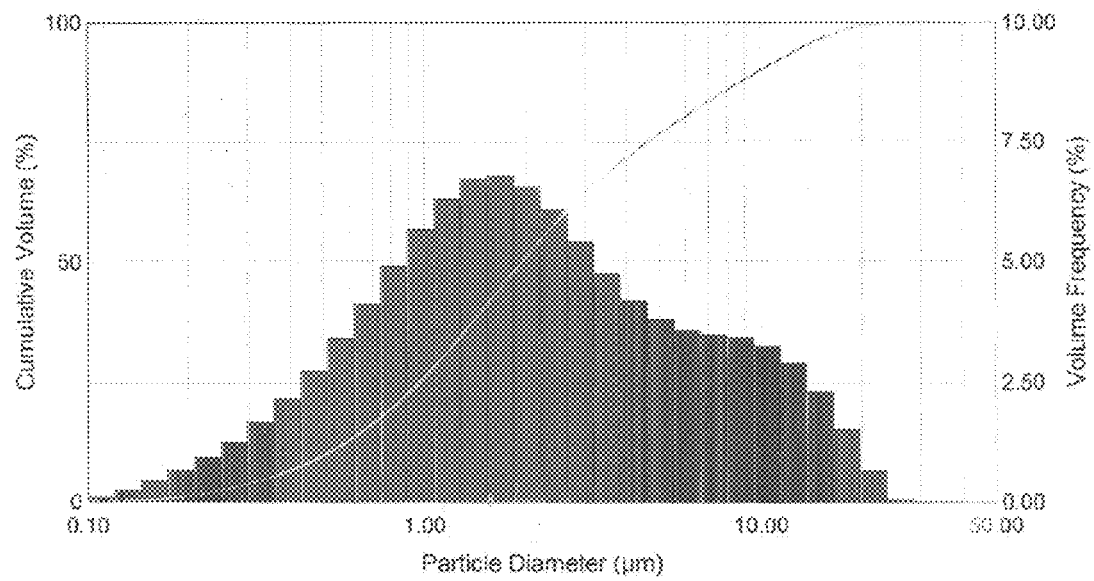
Figure 14:
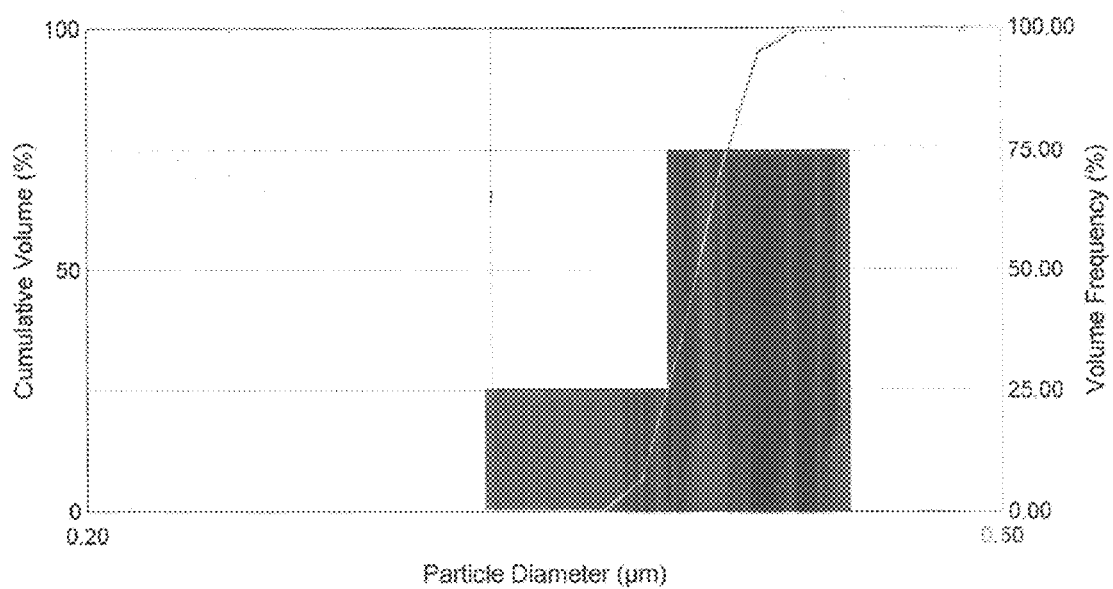

FIGS. 13 and 14 are data reports from embodiments of particle analyzers according to this disclosure.

DETAILED DESCRIPTION OF THE EMBODIMENTS

Existing methods to characterize aerosol and powder particles delivered by inhalers to lungs may not account for environmental conditions (e.g., temperature and humidity) within a respiratory system as the particles travel through the respiratory system. Physical properties of particles may be affected by environmental conditions within a respiratory system as they travel from mouth to lungs. These changes in physical properties may affect where particles deposit in lungs.

Figure 1A:
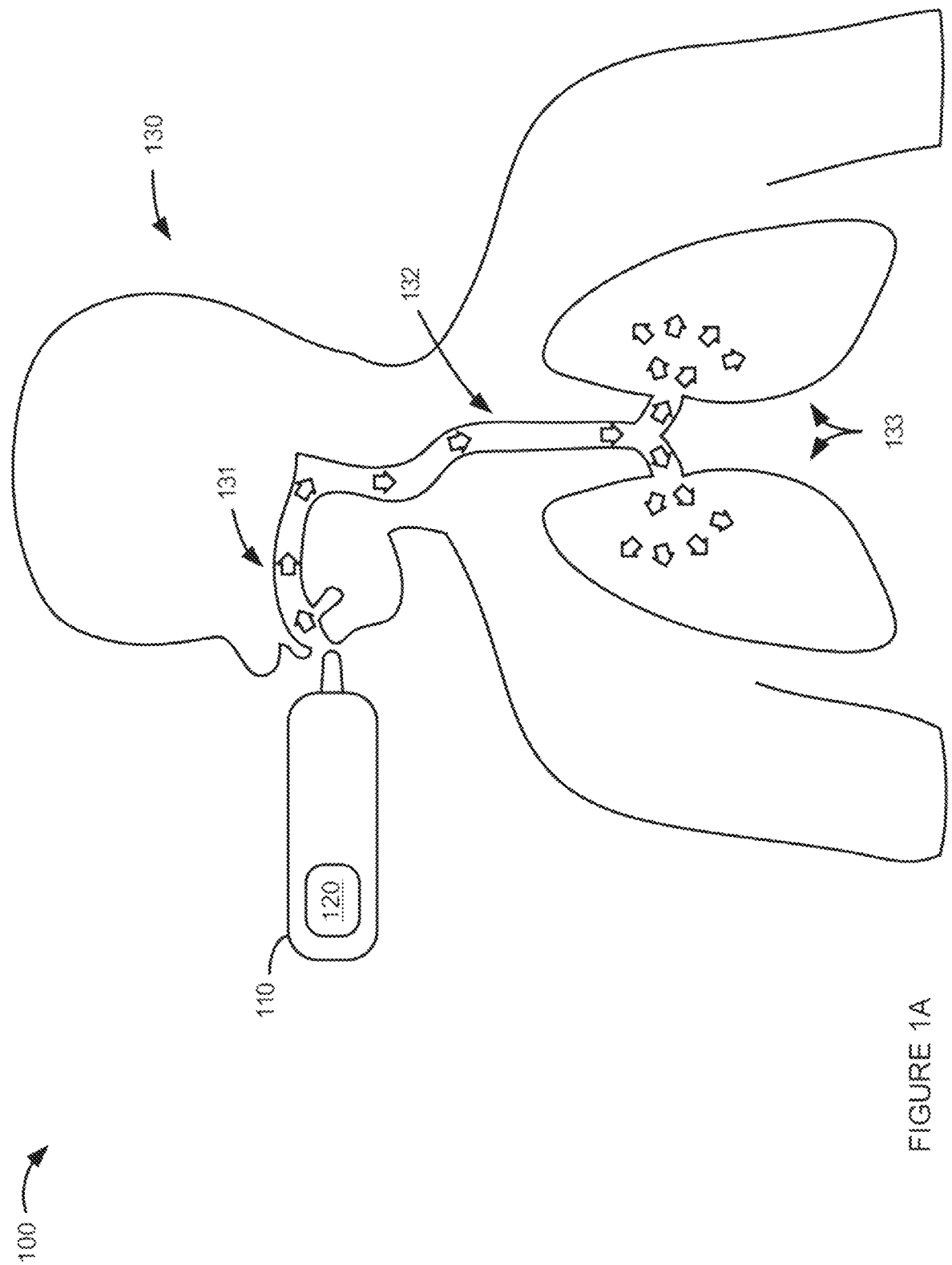

FIG. 1A is a diagram illustrating inhaler 110 and human respiratory system 100. Inhaler 110 may comprises a thermally regulated aerosol generator (TRAG), metered dose inhaler, aerosol inhaler, dry powder inhaler, or some other device intended for delivering drug formulation 120 to lungs 133 of an individual 130. Drug formulation 120 includes one or more chemicals, including combinations thereof, intended for delivery to lungs 133. Human respiratory system 100 comprises an oral cavity 131, a trachea 132, and lungs 133 of the individual 130. Human respiratory system 100 will, generally, have different environmental conditions than ambient air outside of the human respiratory system 100.

Figure 1B:
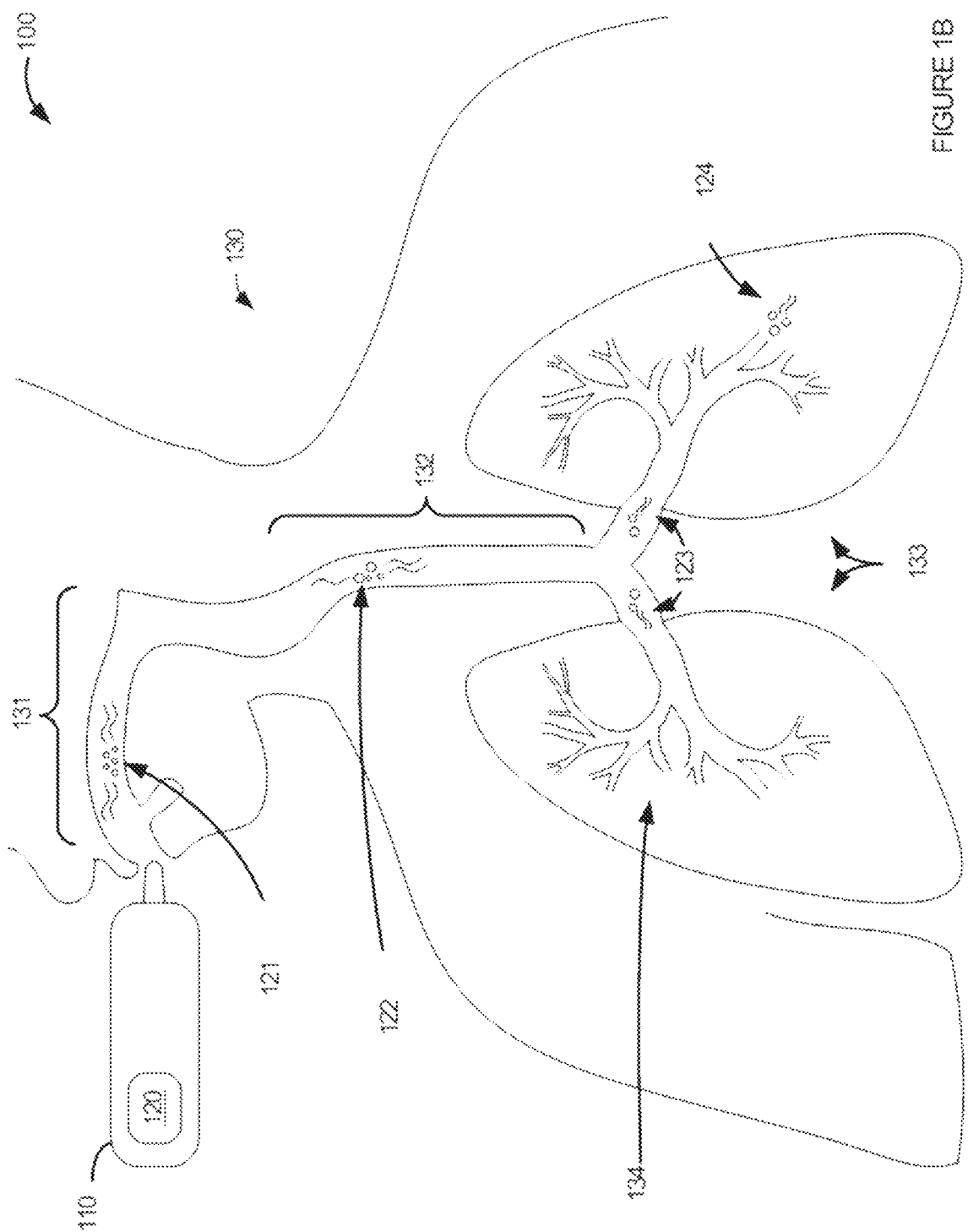

FIG. 1B is a diagram illustrating the operation of inhaler with a human respiratory system 100. In operation, drug formulation 120 is introduced by inhaler 110 to oral cavity 131 of an individual 130 as drug particles 121. Drug particles 121 include, at least, aerosol or powder particles. Upon inhaling, lungs 133 create a low pressure region distal to oral cavity 131 and draw at least drug particles 121 into oral cavity 131. Drug particles 121 are directed by oral cavity 131 to trachea 132. Drug particles 121 may experience a change in physical properties due to environmental conditions within the human respiratory system 100. Drug particles 122 represent drug particles 121 after possibly being affected by the environmental conditions within oral cavity 131 and trachea 132. The flow of drug particles 122 is divided at the left and right stem bronchus. Drug particles 123 represent drug particles 122 after division by the bronchus and possibly affected by the environmental conditions of human respiratory system 100. Drug particles 123 are further drawn into bronchiole tree 134 by lungs 133. Drug particles 123 may be further affected by the environmental conditions within bronchiole tree 134. Eventually, drug particles 123 are transferred to the blood stream by alveolar sacs within lungs 133 as absorbed drug 124.

Figure 2:
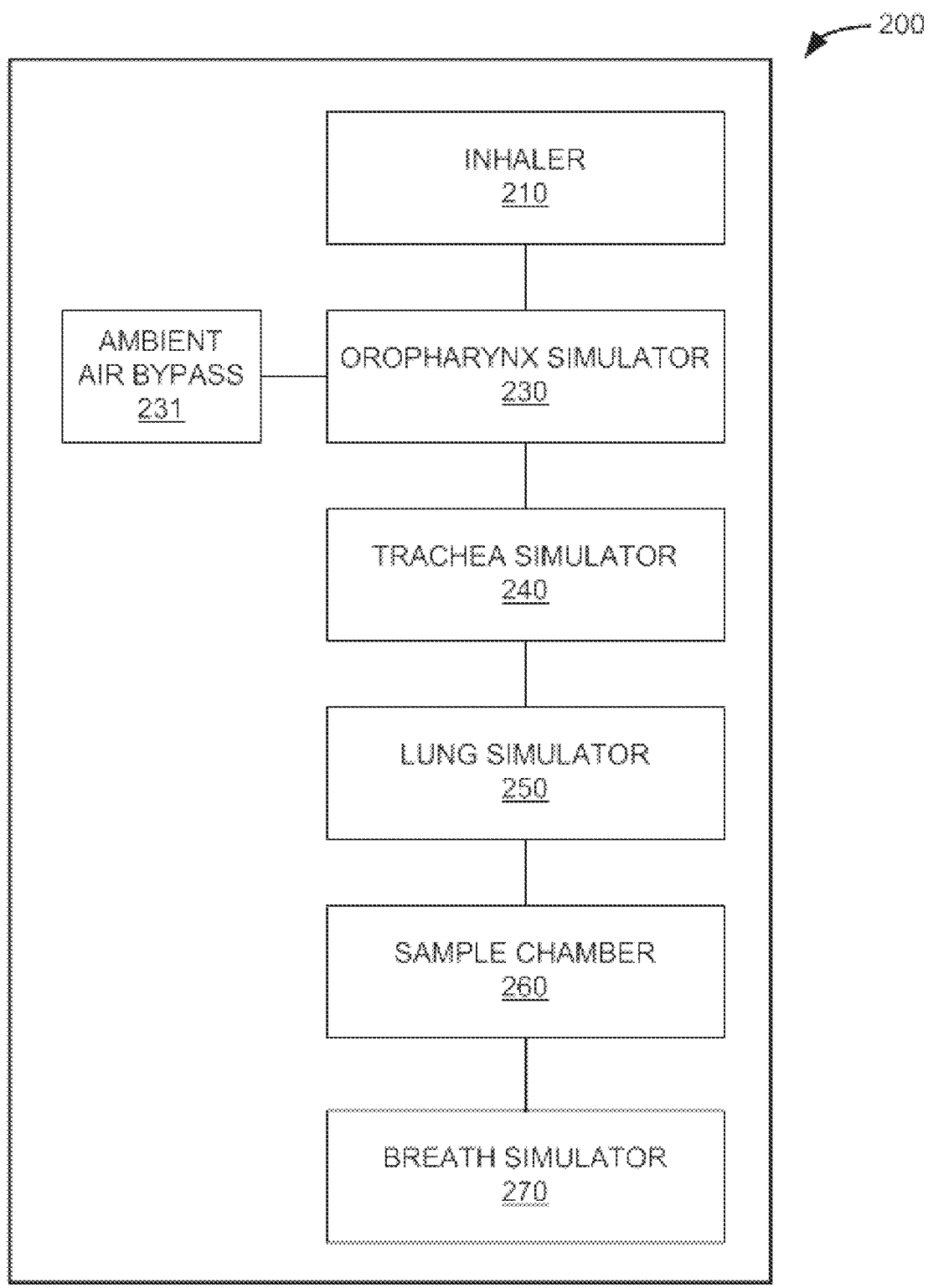

FIG. 2 is a block diagram illustrating respiratory system simulator 200. As illustrated in FIG. 2, respiratory system simulator 200 comprises inhaler 210, oropharynx simulator 230, ambient air bypass 231, trachea simulator 240, lung simulator 250, sample chamber 260 and breath simulator 270. Inhaler 210 may comprises a TRAG, metered dose inhaler, dry powder inhaler, vaporizer, electronic cigarette, or some other type of device intended for delivery of a drug to lungs. Inhaler 210 is configured to contain and deliver at least a drug formulation to lungs.

Respiratory system simulator 200 includes oropharynx simulator 230. Oropharynx simulator 230 is configured to be a modular component of respiratory system simulator 200 so that alternative embodiments of oropharynx simulator 230 may be easily substituted depending upon test requirements. In an embodiment, oropharynx simulator 230 comprises an oral cavity and a pharyngeal cavity configured to simulate the size and shape of an oral cavity and pharyngeal cavity of a living organism. The oral cavity has a first shape and first dimensions that simulate a mouth and oral cavity. The pharyngeal cavity has a second shape and second dimensions that simulate a pharyngeal cavity. Oropharynx simulator 230 may be configured to couple to ambient air bypass 231 and trachea simulator 240. In an embodiment, oropharynx simulator 230 includes a temperature-controlled heater to maintain oropharynx simulator 230 at or near body temperature.

In operation, breath simulator 270 can simulate various breathing patterns through oropharynx simulator 230. Breathing patterns can include various combinations of velocity and timing of flow through respiratory system simulator 200. Breath simulator 270 creates a flow drawing particle generated by inhaler 210 into and through oropharynx simulator 230. Oropharynx simulator 230 includes an inner cavity shape and dimensions that cause particles to travel, and possibly collide with one another, in a manner that simulates an oropharynx.

Respiratory system simulator 200 includes ambient air bypass 231. Ambient air bypass 231 is an optional feature configured to be a modular component of respiratory system simulator 200 so that alternative embodiments of ambient air bypass 231 may be easily substituted depending upon test requirements. Ambient air bypass 231 includes a first port on a distal end configured to interface with ambient air and a second port on a proximal end configured to couple to one or more components of respiratory system simulator 200. In an embodiment, ambient air bypass 231 couples to oropharynx simulator 230. In an embodiment, ambient air bypass 231 may include a valve or regulator to control the direction and flow rate of ambient air within respiratory system simulator 200. The valve or regular may include a mechanical valve or regulator or an electronically operated valve or regulator. In an embodiment, ambient air bypass 231 includes a temperature-controlled heater to maintain ambient air bypass 231 at or near body temperature.

In operation, ambient air bypass 231 is configured to simulate different inhalation and breathing patterns in conjunction with breath simulator 270. Breath simulator 270 creates a flow drawing ambient air into and through ambient air bypass 231. In operation, breath simulator 270 can simulate various breathing patterns through ambient air bypass 231. For example, cigarette smokers may use the oral cavity to create vacuum and draw smoke into the oral cavity, then they will inhale ambient air through the oral cavity, and possibly the nasal cavity, to draw the smoke into the lungs thereby completing the inhalation cycle. Alternatively, users of medical inhalers may be instructed to draw air through the oral cavity, oropharynx, and trachea directly into the lungs. For many users, when inhaling directly into their lungs, the soft palate blocks the oral cavity from the nasal cavity. However, upon exhaling the user may exhale through both their oral and nasal cavities. Therefore, in certain embodiments and depending upon test requirements, ambient air bypass 231 may not be required. The activation and operation of ambient air bypass 231 is optional.

Respiratory system simulator 200 includes trachea simulator 240. Trachea simulator 240 is configured to be a modular component of respiratory system simulator 200 so that alternative embodiments of trachea simulator 240 may be easily substituted depending upon test requirements. Trachea simulator 240 is configured to have a shape and dimensions that simulate a trachea. In an embodiment, trachea simulator 240 is further configured to couple to and direct a flow from oropharynx simulator 230 to lung simulator 250. In an embodiment, trachea simulator 240 includes one or more temperature-controlled heaters to maintain trachea simulator 240 at or near body temperature.

In operation, breath simulator 270 creates a flow drawing particles into and through trachea simulator 240. Trachea simulator 240 includes an inner cavity shape and dimensions that cause particles to travel, and possibly collide with one another, in a manner that simulates an oropharynx.

Respiratory system simulator 200 includes lung simulator 250 configured to be a modular component of respiratory system simulator 200 so that alternative embodiments of lung simulator 250 may be easily substituted depending upon test requirements. In an embodiment, lung simulator 250 is configured to couple to trachea simulator 240. Lung simulator 250 comprises internal components configured to simulate a lung or lungs. In an embodiment, lung simulator 250 includes one or more temperature-controlled heater to maintain lung simulator 250 at or near body temperature.

In operation, breath simulator 270 creates a flow drawing particles into and through lung simulator 250. Lung simulator 250 receives and divides a flow of particles in a manner simulating a lung or lungs. Particles traveling through lung simulator 250 may experience a change in physical properties similar to what may happen to particles travel through a lung.

Respiratory system simulator 200 includes sample chamber 260 configured to be a modular component of respiratory system simulator 200 so that alternative embodiments of sample chamber 260 may be easily substituted depending upon test requirements. Sample chamber 260 is configured to receive a flow of particles for analysis. In an embodiment, sample chamber 260 includes a sampling window for optical particle analysis methods, such as laser diffraction, to characterize particle distribution. In an embodiment, sampling chamber 260 includes a humidity port for measuring humidity within sample chamber 260. In an embodiment, sample chamber 260 includes a temperature port for measuring the temperature within sampling chamber 260. In an embodiment, lung simulator 250 includes one or more temperature-controlled heaters to maintain sample chamber 260 at or near body temperature.

In operation, Breath simulator 270 draws a flow through respiratory system simulator 200 that simulates breathing or a breath. The physical properties of particles generated by inhaler 210 may change as they travel through respiratory system simulator 200. Sample chamber 260 receives the particles for analysis.

Respiratory system simulator 200 includes breath simulator 270 configured to be a modular component of respiratory system simulator 200 so that alternative embodiments of breath simulator 270 may be easily substituted depending upon test requirements. Breath simulator 270 provides a flow through respiratory system simulator 200 that simulates the timing and velocity of a breath through a respiratory system. Breath simulator 270 is configured to be adjustable to simulate an intentional deep inhale or regular breathing. In operation, breath simulator controls at least the timing and velocity of a flow of particles through respiratory system simulator 200.

In some embodiments, the inner cavities of respiratory system simulator 200 may include a cavity lining. The meaning of 'cavity lining' as used herein will now be described. The human respiratory tract is lined with epithelium and connective tissue, which are comprised of various different types of cells. In some embodiments, the cavity lining may comprise a substrate suitable as a growth media for cells, bacteria, viruses, or other microorganisms in order to more closely model a respiratory system. In some embodiments, the cavity lining may comprise a hydrophilic substance configured to simulate the environmental conditions of a respiratory system. In some embodiments, the cavity lining may comprise a hydrogel.

In some embodiments, the cavity lining comprises a biocompatible film configured to grow microorganisms. The cavity lining permits the culture of generic cells or cells specific to an individual human. In some embodiments, the cavity lining may comprise cells simulating a healthy respiratory system. In some embodiments, the cavity lining may comprise diseased cells in order to test the efficacy of drugs or drug delivery methods. The healthy respiratory simulation can be used as a control during testing of an unhealthy respiratory simulation. For example, mucus secreting cells may be triggered to replicate the conditions of cystic fibrosis for researching potential cures.

The trachea, bronchi and bronchioles are comprised of epithelium tissue and connective tissue. Epithelium tissue is comprised of the following cells: Clara cells, Basal cells, neuroendocrine cells, and goblet cells. Clara cells are secretory cells that secrete proteins, glycoproteins, lipids, and enzymes. Basal cells are found in the deepest layer of the epithelium. Basal cells provide replacements for dead cells of the epithelium. Neuroendocrine cells receive neuronal input and release hormones to the blood. Goblet cells secrete the main component of mucus. Connective tissue is comprised of fibroblast cells. Fibroblast cells create an extracellular matrix and collagen to form connective tissue.

The alveoli is comprised of epithelium tissue and bronchioalveolar stem cells. Epithelium tissue is comprised of two types of pneumocyte cells (Type 1 and Type 2). Type 1 pneumocyte cells are responsible for gas exchange that takes place in the alveoli. Type 2 pneumocyte cells are responsible for production and secretion of surfactants (molecules that reduce surface tension of the pulmonary fluids). Bronchio-alveolar stem cells are undifferentiated cells found in lungs that are capable of giving rise to indefinitely mores cells of the same type.

The respiratory system also includes immune cells. Some types of immune cells found in the respiratory system include: macrophages, dendritic, Langerhans cells, neutrophils and lymphoid cells. Macrophages are a type of white blood cell. Dendritic cells are antigen-presenting cells of the immune system. Their main function is to process antigen material and present it on the cell surface to the T cells of the immune system. Langerhans cells are a type of dendritic cells found in mucosa. Neutrophils are a type of white blood cell. Lymphoid cells differentiate into natural killer (NK) cells or white blood cells.

Recipes for growth media can vary in pH, glucose concentration, growth factors, and the presence of other nutrients. The growth factors used to supplement media are often derived from the serum of blood. In some embodiments, the cavity lining may comprise human platelet lysate (hPL). In some embodiments, the cavity lining may comprise a chemically defined media. Cells can be grown either in suspension or adherent cultures. In some embodiments, the cavity lining may comprise adherent culture. Some cells are known as adherent cells. Adherent cells require a surface, such as tissue culture plastic or microcarrier, which may be coated with extracellular matrix (such as collagen and laminin) components to increase adhesion properties and provide other signals needed for growth and differentiation. Most cells derived from solids tissues are adherent. Another type of adherent culture is organotypic culture, which involves growing cells in a three-dimensional environment as opposed to two-dimensional culture dishes. This three-dimensional culture system is biochemically and physiologically more similar to in vivo tissue. Three-dimensional cultures may be beneficial in research areas including drug discovery, cancer biology, regenerative medicine and basic life science research. In some embodiments, the cavity lining may comprise nanoparticle facilitated magnetic levitation, gel matrices scaffolds, hanging drop plates or other platforms suitable for three-dimensional culture. Three-dimensional cell culturing is scalable, with the capability for culturing five-hundred to millions of cells.

In some embodiments, the cavity lining may be configured for the growth of viruses. The culture of viruses requires the culture of mammalian, plant, fungal, or bacterial origin as host for the growth and replication of the virus. Whole wild type viruses, recombinant viruses or viral products may be generated in cell types other than their natural hosts under the right conditions. Some types of human viruses that can be identified include: adenovirus, cytomegalovirus, enteroviruses, herpes simplex virus, influenza virus, parainfluenza virus, rhinovirus, respiratory syncytial virus, varicella zoster virus, measles, and mumps.

In some embodiments, the cavity lining may comprise a nutrient media. Nutrient media comprises elements that most microorganisms need for growth. In some embodiments, the cavity lining may comprise an undefined medium. An undefined medium (also known as a basal or complex medium) is a medium that contains a carbon source such as glucose for bacterial growth, water, various salts needed for bacterial growth, a source of amino acids and nitrogen. In some embodiments, the cavity lining may comprise a defined medium. A defined medium (also known as chemically defined medium or synthetic medium) is a medium in which all the chemicals used are known, and no yeast, animal, or plant tissue is present. Some examples of nutrient media include plate count agar, nutrient agar, and trypticase soy agar. In some embodiments, the cavity lining may comprise a minimal media. Minimal media are those that contain the minimum nutrients possible for colony growth, generally without the presence of amino acids, and are often used by microbiologists and geneticists to grow "wild type" microorganisms. Minimal media can also be used to select for or against recombinants or exconjugants. Minimal media typically contains a carbon source, various salts and water. In some embodiments, the cavity lining may comprise a supplementary minimal media. Supplementary minimal media are a type of minimal media that also contains a single selected agent, usually an amino acid or a sugar. This supplementation allows for the culturing of specific lines of auxotrophic recombinants.

In some embodiments, the cavity lining may comprise selective media. Selective media are used for the growth of only selected microorganisms. For example, if a microorganism is resistant to a certain antibiotic, such as ampicillin or tetracycline, then that antibiotic can be added to the medium in order to prevent other cells, which do not possess the resistance, from growing. Some example of selective media include Eosin Methylene Blue (EMB), Yeast and Mold (YM), MacConkey Agar (MCK), Hektoen Enteric Agar, Mannitol Salt Agar (MSA), Terrific Broth (TB), Xylose Lysine Desoxycholate (XLD), Buffered Charcoal Yeast Extract Agar and Baird-Parker Agar.

In some embodiments, the cavity lining may comprise differential media. Differential media or indicator media distinguish one microorganism type from another growing on the same media. This type of media uses the biochemical characteristics of a microorganism growing in the presence of specific nutrients or indicators (such are neutral red, phenol red, eosiny, or methylene blue) added to the medium to visibly indicate the defining characteristics of a microorganism. Some examples of differential media include Blood Agar, Eosin Methylene Blue (EMB), Granada Medium, MacConkey Agar (MCK), and Mannitol Salt Agar (MSA).

In some embodiments, the cavity lining may comprise transport media. Transport media generally includes the following criteria: temporary storage of specimens, maintain the viability of all organisms in the specimen without altering their concentration, contain only buffers and salt, lack of carbon, nitrogen, and organic growth factors so as to prevent microbial multiplication and for the isolation of anaerobes, and to be free of molecular oxygen. Some examples of transport media include Thioglycolate Broth, Stuart Transport Medium and Venkataraman Ramakrishna (VR) medium. In some embodiments, the cavity lining may comprise an enriched media. Blood agar and chocolate agar are two examples of enriched media.

The cavity lining may be used to grow and research respiratory tract infections and the bacteria and viruses that cause them. The cavity lining may be used to study efficacy of certain drugs or chemicals used to treat respiratory tract disease. Some types of respiratory tract diseases include: asthma, chronic obstructive pulmonary disease (COPD), bronchitis, cystic fibrosis, pneumonia, tuberculosis, pulmonary edema, lung cancer, acute respiratory distress syndrome (ARDS), pneumoconiosis, sarcoidosis and idiopathic pulmonary fibrosis.

The cavity lining may be used to research the effects of air pollutants on a respiratory system by simulating the cells and microorganism that grow within it. Some common air pollutants include ozone, particulate matter (components include acids, organic chemicals, metals, and soil or dust particles), carbon monoxide, nitrogen oxides, sulfur dioxides, and lead.

Figure 3:
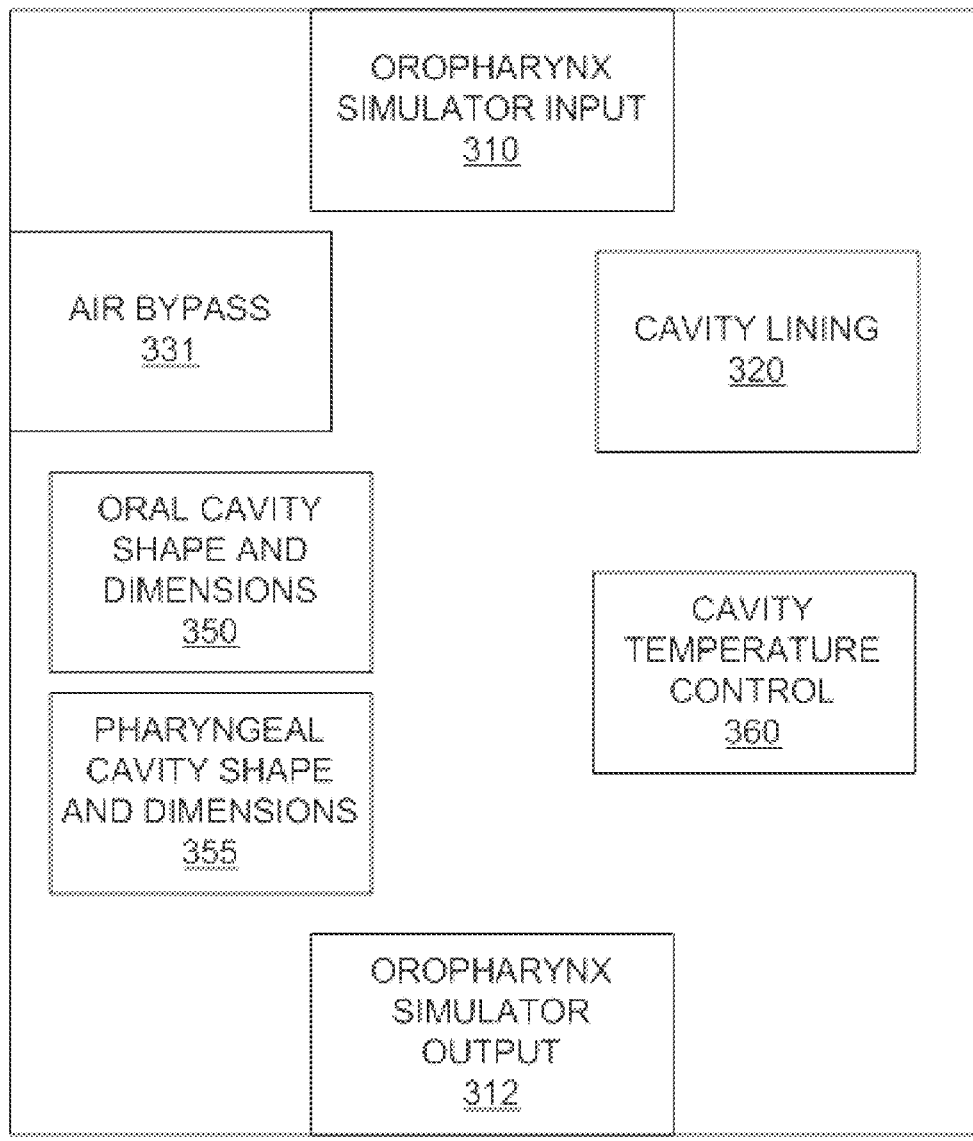

FIG. 3 is a block diagram illustrating oropharynx simulator 300. Oropharynx simulator 300 may be configured to be a modular component of a respiratory system simulator, such as respiratory system simulator 200, so that alternative embodiments of oropharynx simulator 300 may be easily substituted depending upon test requirements. Oropharynx simulator 300 includes oropharynx simulator input 310, oropharynx simulator output 312, cavity lining 320, air bypass 331, oral cavity shape and dimensions 350, pharyngeal cavity shape and dimensions 355 and cavity temperature control 360.

Oropharynx simulator 300 includes oropharynx simulator input 310 and oropharynx simulator output 312. Oropharynx simulator input 310 is configured to receive a flow of particles from outside oropharynx simulator 300. In an embodiment, oropharynx simulator input 310 may include a shape and dimensions to simulate a mouth. Oropharynx simulator output 312 is configured to direct a flow of particles out of oropharynx simulator 300. Oropharynx simulator input 310 and oropharynx simulator output 312 may be integral to, or a separate component of, oropharynx simulator 300. In addition, oropharynx simulator input 310 and oropharynx simulator output 312 may be configured to couple to modular components of a respiratory system simulator, such as respiratory system simulator 200.

Oropharynx simulator 300 includes cavity lining 320. In operation, cavity lining 320 may be applied to oropharynx simulator 300 prior to performing a test method and removed after completion of the test method. Cavity lining 320 may be changed depending upon test requirements and conditions. In operation, particles may come into contact with and be affect by cavity lining 320.

Oropharynx simulator 300 includes air bypass 331. Air bypass 331 is an optional feature configured to be a modular component of oropharynx simulator 312 so that alternative embodiments of air bypass 331 may be easily substituted depending upon test requirements. In an embodiment, air bypass 331 includes a first port on a distal end configured to interface with ambient air and a second port on a proximal end configured to couple to oropharynx simulator 300. In an embodiment, air bypass 331 is integral to oropharynx simulator 300. In an embodiment, air bypass 331 may include a valve or regulator to control the direction and flow rate of ambient air within oropharynx simulator 300. The valve or regular may include a mechanical valve or regulator or an electronically operated valve or regulator. In an embodiment, air bypass 331 includes a temperature-controlled heater to maintain air bypass 331 at or near body temperature. In an embodiment, the interior cavity of air bypass 331 may be coated with cavity lining 320.

In operation, air bypass 331 is configured to simulate different inhalation and breathing patterns in conjunction with a breath simulator. A breath simulator is used to creates a flow drawing ambient air into and through air bypass 331. In operation, the breath simulator can simulate various breathing patterns through air bypass 331. The activation and operation of ambient air bypass 331 is optional depending upon test requirements.

Oropharynx simulator 300 includes oral cavity shape and dimensions 350. Oral cavity shape and dimensions 350 comprise data used to simulate an oral cavity within oropharynx simulator 300. Oral cavity shape and dimensions 350 may vary depending upon test requirements. For example, an oropharynx simulator 300 configured to characterize particle distribution in the lungs of children will have different oral cavity shape and dimensions 350 than one configured to simulate the lungs of an adult. The modular configuration of oropharynx simulator 300 allows embodiments of oropharynx simulator 300 having different oral cavity shape and dimensions 350 to be easily changed to meet test requirements.

Oropharynx simulator 300 includes pharyngeal cavity shape and dimensions 355. Pharyngeal cavity shape and dimensions 355 comprise data used to simulate a pharyngeal cavity within oropharynx simulator 300. Pharyngeal cavity shape and dimensions 355 may vary depending upon test requirements. The modular configuration of oropharynx simulator 300 allows embodiments having different pharyngeal cavity shape and dimensions 355 to be easily changed to meet test requirements.

Oropharynx simulator 300 includes cavity temperature control 360. Cavity temperature control 360 includes a heat source, a means to measure the temperature of oropharynx simulator 300 and a means to control the heat source based upon the temperature measurements. The heat source may comprise wire or ribbon resistance materials, heating elements, cartridge heaters or some other means of generating heat. The means to measure temperature may comprise thermocouples, thermistors, resistance temperature detectors, non-contact thermal measurement devices, or other means to measure temperature. The means to control the heat source may comprise a temperature controller, programmable logic controller (PLC), computer, thermostat, or some other means capable of adjusting the output of the heat source.

In operation, a breath simulator can simulate various breathing patterns through oropharynx simulator 300. Breathing patterns can include various combinations of velocity and timing of particle flow. Cavity lining 320, air bypass 331, oral cavity shape and dimensions 350, pharyngeal cavity shape and dimensions 355 and cavity temperature control 360 simulate the environment and pathway of a respiratory system that may affect the physical properties of particles traveling through oropharynx simulator 300. For example, at points along a path of travel, particles may collide with one another, or with cavity lining 320, and be affected by environmental conditions within oropharynx simulator 300.

Figure 4:
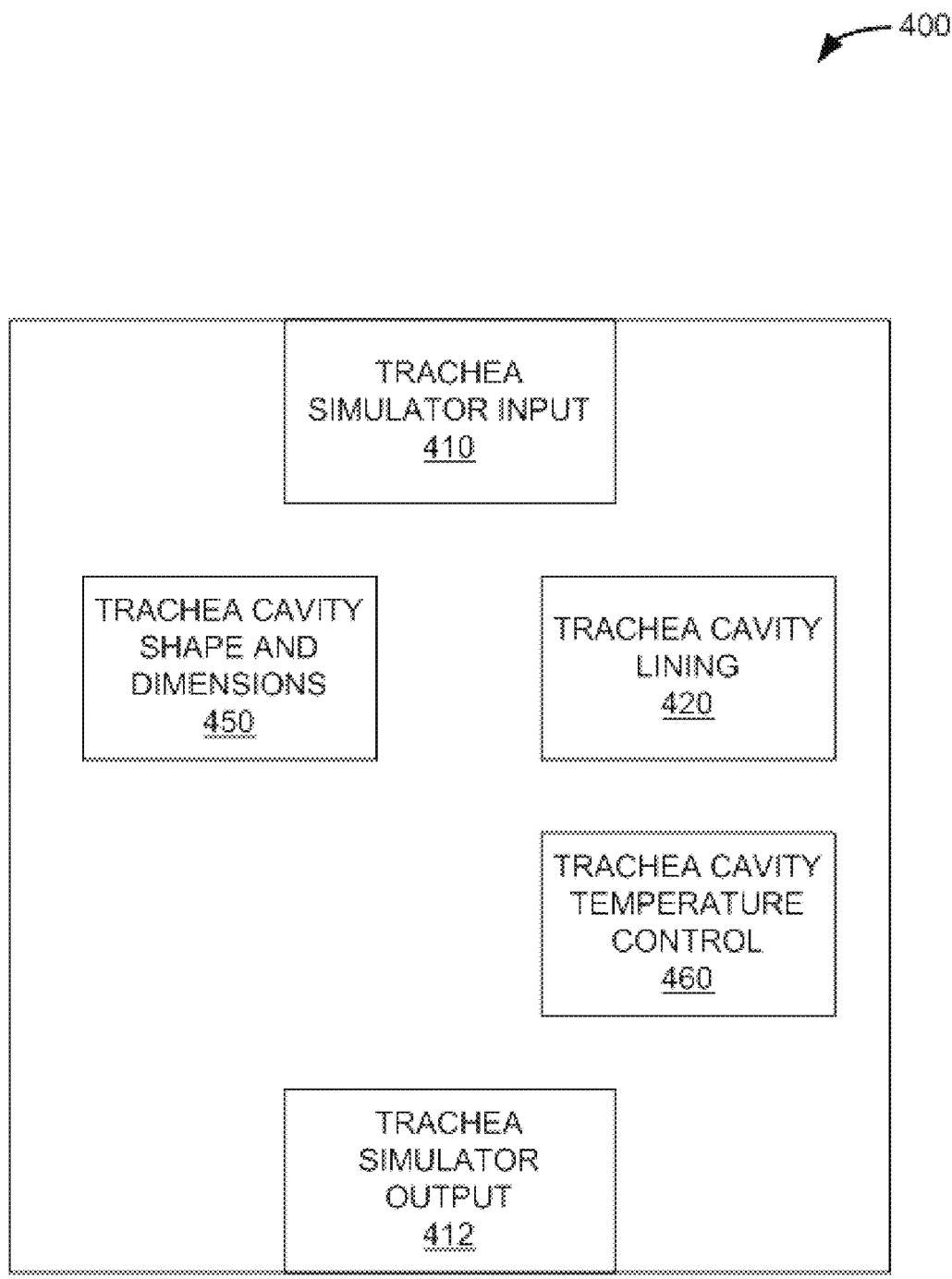

FIG. 4 is a block diagram illustrating trachea simulator 400. Trachea simulator 400 may be configured to be a modular component of a respiratory system simulator, such as respiratory system simulator 200, allowing alternative embodiments of trachea simulator 400 to be easily substituted depending upon test requirements. Trachea simulator 400 includes trachea simulator input 410, trachea simulator output 412, cavity lining 420, trachea cavity shape and dimensions 450 and trachea cavity temperature control 460.

Trachea simulator 400 includes trachea simulator input 410 and trachea simulator output 412. Trachea simulator input 410 is configured to receive a flow of particles from outside trachea simulator 400. Trachea simulator output 412 is configured to direct a flow of particles out of trachea simulator 400. Trachea simulator input 410 and trachea simulator output 412 may be integral to, or a separate component of, trachea simulator 400. In addition, trachea simulator input 410 and trachea simulator output 412 may be configured to couple to modular components of a respiratory system simulator, such as respiratory system simulator 200.

Trachea simulator 400 includes cavity lining 420. In operation, cavity lining 420 may be applied to trachea simulator 400 prior to performing a test method and removed after completion of the test method. Cavity lining 420 may be changed depending upon test requirements and conditions.

Trachea simulator 400 includes trachea cavity shape and dimensions 450. Trachea cavity shape and dimensions 450 comprise data used to simulate the internal dimensions and geometry of a trachea. Trachea cavity shape and dimensions 450 may vary depending upon test requirements. The modular configuration of trachea simulator 400 allows embodiments of trachea simulator 400 having different trachea cavity shape and dimensions 450 to be easily changed to meet test requirements.

Trachea simulator 400 includes trachea cavity temperature control 460. Trachea cavity temperature control 460 includes a heat source, a means to measure the temperature of trachea simulator 400 and a means to control the heat source based upon the temperature measurements. The heat source may comprise wire or ribbon resistance materials, heating elements, cartridge heaters or some other means of generating heat. The means to measure temperature may comprise thermocouples, thermistors, resistance temperature detectors, non-contact thermal measurement devices or other means to measure temperature. The means to control the heat source may comprise a temperature controller, programmable logic controller (PLC), computer, thermostat or some other means capable of adjusting the output of the heat source.

In operation, a breath simulator can simulate various breathing patterns through trachea simulator 400. Breathing patterns can include various combinations of velocity and timing of particle flow. Cavity lining 420, trachea cavity shape and dimensions 450, and trachea cavity temperature control 460 simulate the environment and pathway of a respiratory system that may affect the physical properties of particles traveling through trachea simulator 400.

Figure 5A:
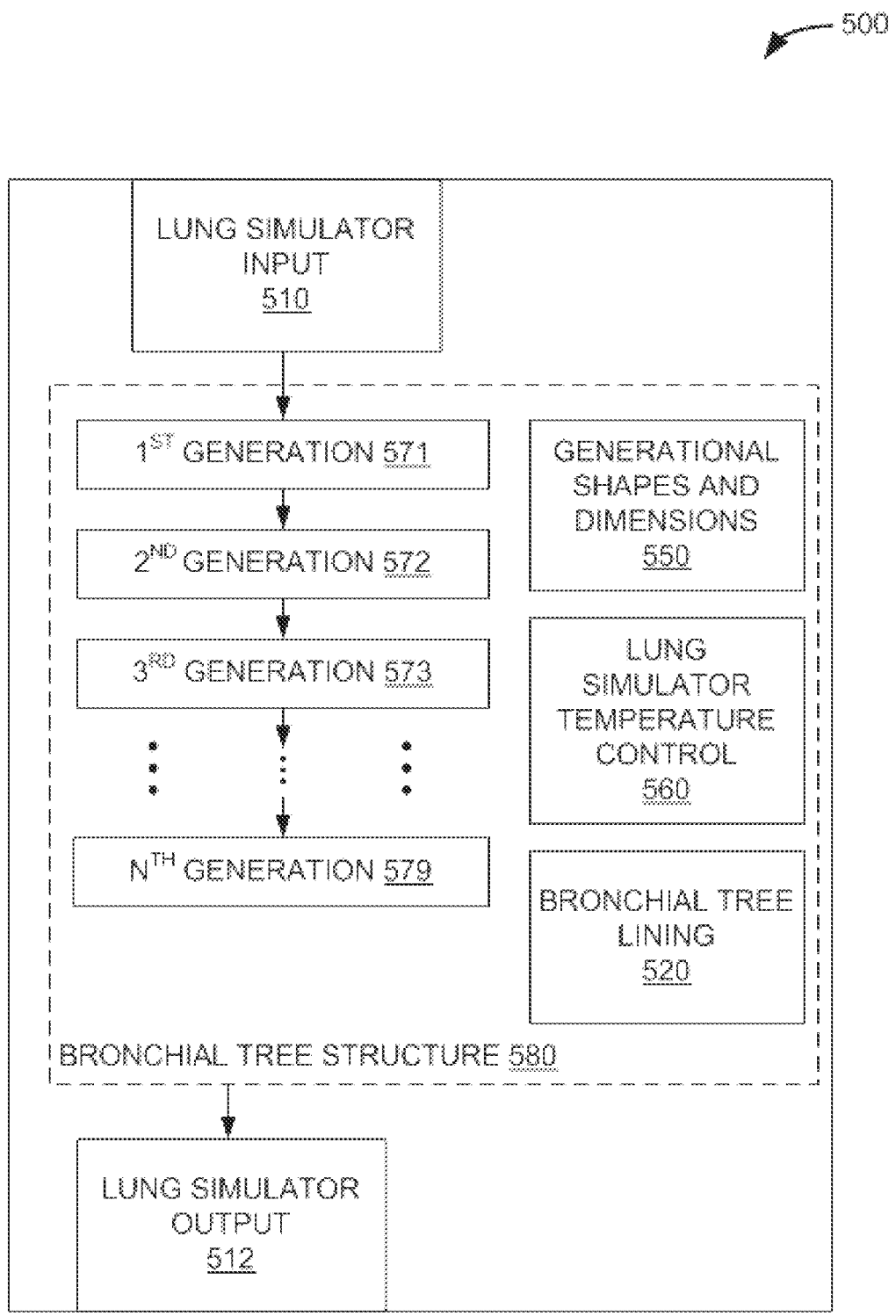
FIG. 5B is a block diagram illustrating a bronchial tree structure.

FIG. 5A is a block diagram illustrating lung simulator 500. Lung simulator 500 may be configured to be a modular component of a respiratory system simulator, such as respiratory system simulator 200, so that alternative embodiments of lung simulator 500 may be easily substituted depending upon test requirements. Lung simulator 500 comprises lung simulator input 510, lung simulator output 512, and bronchial tree structure 580.

Lung simulator 500 includes lung simulator input 510 and lung simulator output 512. Lung simulator input 510 is configured to receive a flow of particles from outside lung simulator 500. Lung simulator output 512 is configured to direct a flow of particles out of lung simulator 500. Lung simulator input 510 and lung simulator output 512 may be integral to, or a separate component of, lung simulator 500. In addition, lung simulator input 510 and lung simulator output 512 may be configured to couple to modular components of a respiratory system simulator, such as respiratory system simulator 200.

Lung simulator 500 includes bronchial tree structure 580. Bronchial tree structure 580 comprises cavity lining 520, generational shapes and dimensions 550, lung simulator temperature control 560, first generation 571, second generation 572, third generation 573 and $N^{th}$ generation 579.

Bronchial tree structure 580 includes cavity lining 520. Cavity lining 520 may be changed depending upon test requirements and conditions. In operation, cavity lining 520 may be applied to lung simulator 500 prior to performing a test method and removed after completion of the test method.

Bronchial tree structure 580 includes generational shapes and dimensions 550. Generational shapes and dimensions 550 comprise data used to simulate bronchial tree structure 580 within lung simulator 500. Generational shape and dimensions 550 may vary depending upon test requirements. In operation, generational shapes and dimensions 550 cause particles to flow in a manner that simulates particle flow through a lung.

Bronchial tree structure 580 includes lung simulator temperature control 560. Lung simulator temperature control 560 may comprise a heat source, a means to measure the temperature of lung simulator 500 and a means to control the heat source based upon temperature measurements. The heat source may comprise wire or ribbon resistance materials, heating elements, cartridge heaters, electronic resistors, infrared, or some other means of generating heat. The means to measure temperature may comprise thermocouples, thermistors, resistance temperature detectors and infrared or other non-contact means to measure temperature. The means to control the heat source may comprise a programmable logic controller (PLC), computer, thermostat, or some other means capable of adjusting the output of the heat source. In operation, lung simulator temperature control 560 maintains lung simulator 500 at or near body temperature.

Bronchial tree structure 580 includes first through $N^{th}$ generation 571-579 configured to simulate a bronchial tree structure 580 within a lung. First through $N^{th}$ generation 571-579 are modular components configured to be easily replaceable with alternative embodiments depending upon test requirements. Bronchial tree structure 580 may include any number of first through $N^{th}$ generations 571-579 depending upon test requirements. In a typical embodiment, the earlier generations, such as first through third generation 571-573, are configured to simulate the bronchus of an upper lung, while latter generations, such as $N^{th}$ generation 579 and beyond are configured to simulate the bronchioles of a lower lung. In an embodiment, $N^{th}$ generation and beyond may include perforated plates having a plurality of passageways that simulate bronchioles of a lower lung.

In an embodiment, bronchial tree structure 580 includes a simulated upper lung airway system configured to receive a flow comprising particles to be drawn from lung simulator input 510 through the simulated upper lung airway system. In an embodiment, bronchial tree structure 580 includes a simulated lower lung airway system including the final airway generation configured to receive a divided flow of particles from the simulated upper lung airway system. In an embodiment, bronchial airway generations 571-579 include alignment features configured to position the airways in relation to each other. In an embodiment, bronchial airway generations 571-579 may be configured to replicate the shape and dimensions of bronchial tree structure 580.

In operation, lung simulator 500 couples to a breath simulator via lung simulator output 512 configured to simulate various breathing patterns. The breath simulator creates a flow of particles within lung simulator 500. Lung simulator input 510 receives the flow and directs it to bronchial tree structure 580. First generation 571 receives the flow and divides it into a plurality of flows simulating the first generation bronchus of a respiratory system. Second generation 572 and beyond continue dividing the pluralities of flows into additional pluralities of flows in a manner simulating an upper lung. $N^{th}$ generation 579 and beyond further divide the flows in a manner simulating bronchioles. The divided flows are directed out lung simulator output 512.

Figure 5B:
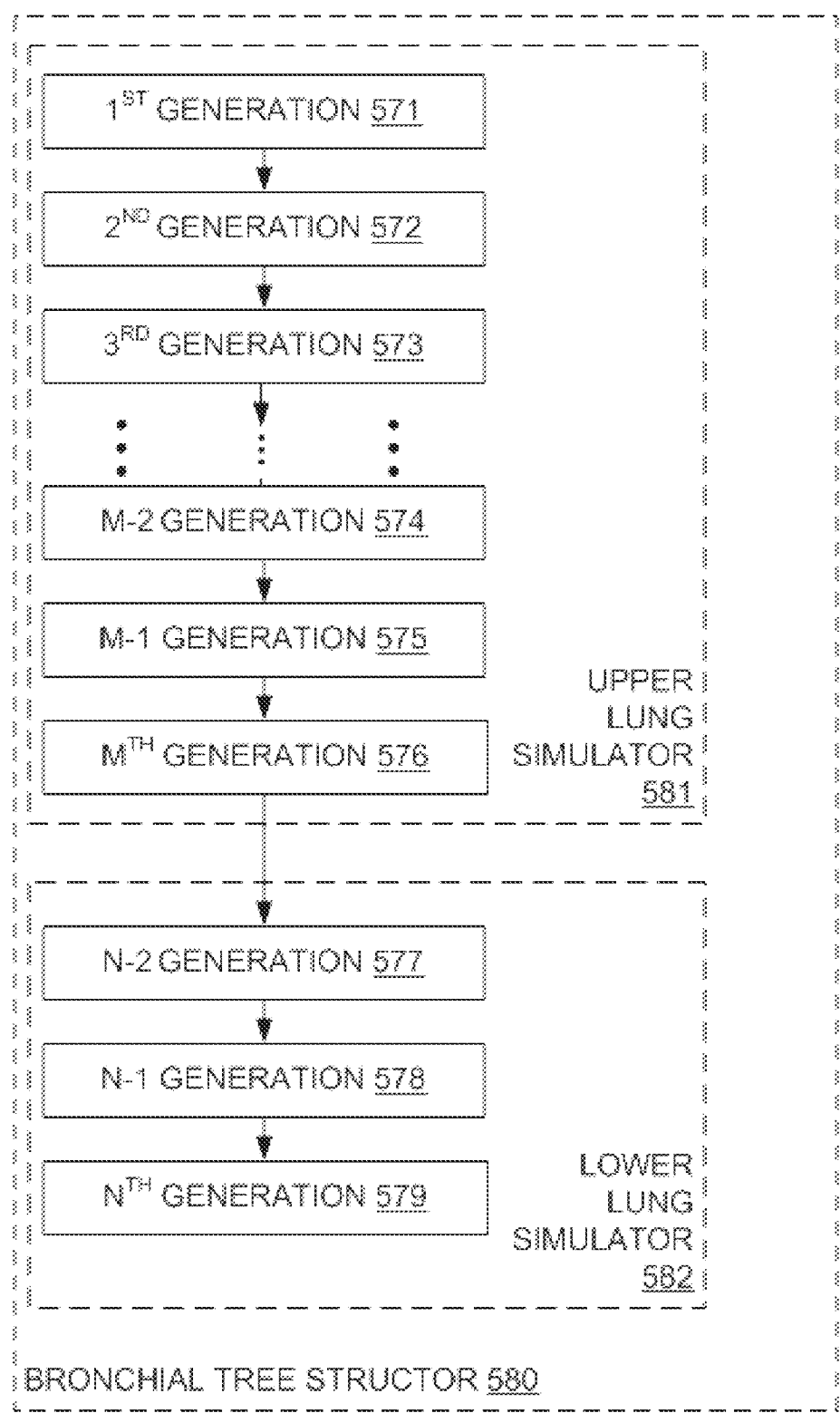

FIG. 5B is a block diagram illustrating bronchial tree structure 580. Bronchial tree structure 580 includes upper lung simulator 581 and lower lung simulator 582. Upper lung simulator 581 comprises bronchial airway generations 571-579. Lower lung simulator 582 comprises bronchial airway generations 577-579. The interior cavities of bronchial tree structure 580 may be coated with a cavity lining 520.

Bronchial tree structure 580 includes upper lung simulator 581. Upper lung simulator 581 is configured to be a modular component of bronchial tree structure 580 so that alternative embodiments of upper lung simulator 581 may be easily substituted depending upon test requirements. Upper lung simulator 581 comprises first through $M^{th}$ generations 571-576. Generations 571-576 are configured to simulate the bronchus of an upper lung. First generation 571 is configured to receive a flow comprising particles and divide the flow into a plurality of flows simulating the first generation bronchus of a respiratory system. Subsequent generations 572-576 receive and continue dividing the flows. $M^{th}$ generation 576 is configured to direct the plurality of flows from upper lung simulator 581 to lower lung simulator 582.

Bronchial tree structure 580 comprises lower lung simulator 582 configured to be a modular component of bronchial tree structure 580 such that alternative embodiments of lower lung simulator 582 may be easily substituted depending upon test requirements. Lower lung simulator 582 includes N-2 through $N^{th}$ generations 577-579 configured to simulate bronchioles of a lung. Bronchial tree structure may include any number of generations 577-579 depending upon test requirements. In an embodiment, N-2 generation 577 and beyond include perforated plates having a plurality of passageways that simulate bronchioles of a lower lung. In an embodiment, generations 577-579 include alignment features configured to position generations 577-579 in relation to each other.

Figure 6:
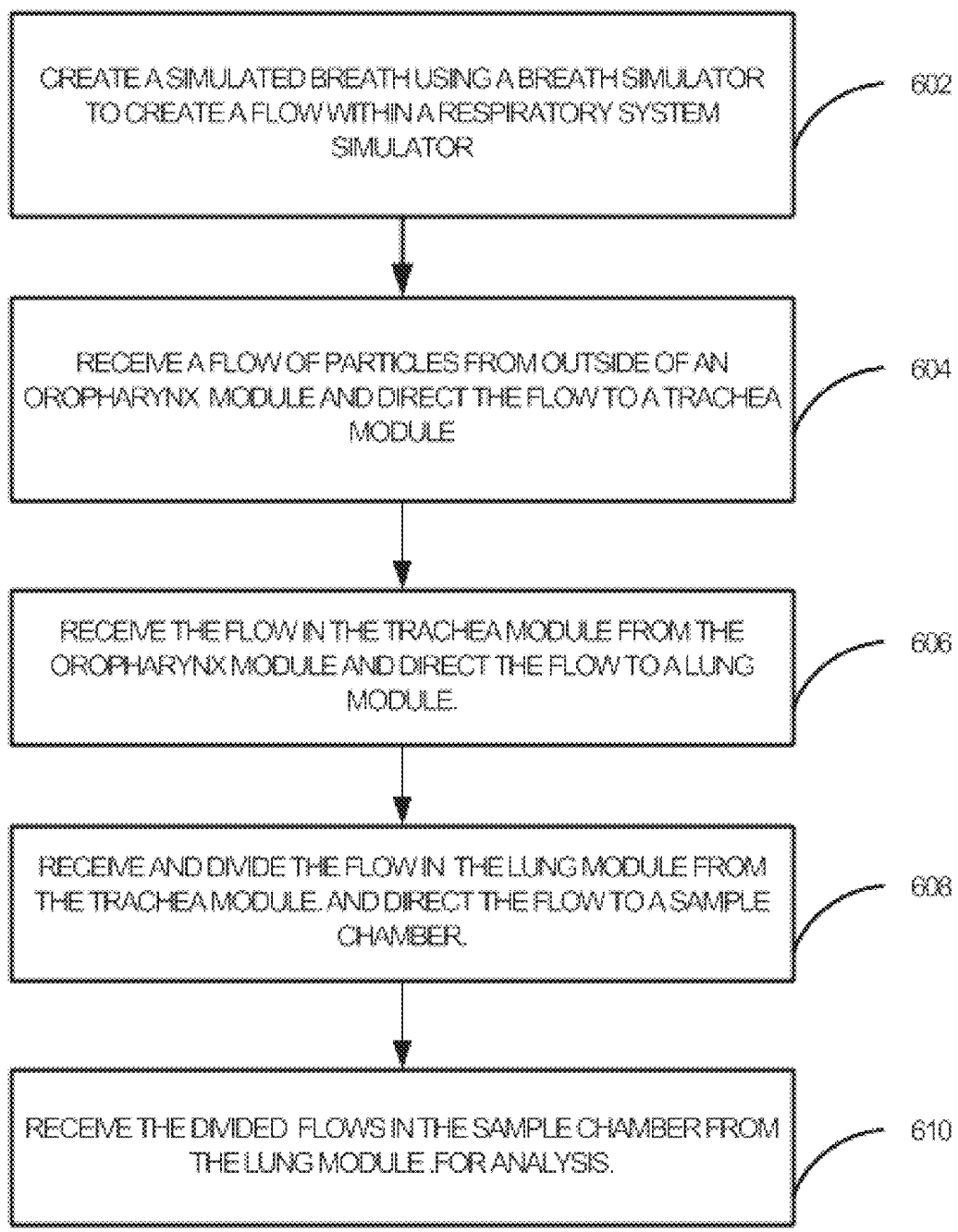
FIG. 6 is a flowchart illustrating a method of operating a respiratory system simulator.

FIG. 6 is a diagram illustrating a method of operating a respiratory system simulator 200. The steps illustrated in FIG. 6 may be performed by one or more elements of respiratory system simulator 200. The operations illustrated in FIG. 6 are identified parenthetically in the following description. A breath simulator creates a simulated breath thereby creating a flow of particles within a respiratory system simulator (602). For example, the breath simulator controls pressure, velocity and timing of a flow through respiratory system simulator 200. An oropharynx module receives the flow of particles created by the breath simulator and directs the flow to a trachea module (604). For example, oropharynx simulator input 310 receives a flow of particles and directs the flow through oropharynx simulator 300. The physical properties of the particles may be affected by cavity lining 320 and cavity temperature control 360 as they travel through oropharynx simulator 300. Oral cavity shape and dimensions 350 and pharyngeal cavity shape and dimensions 355 may affect the path of travel of the particles causing the particles to interact with cavity lining 320 and cavity temperature control 360 in a manner simulating a respiratory system. Air bypass 331 may control delivery of ambient air to oropharynx simulator 300 and further affect the physical properties of the particles. Oropharynx simulator 300 directs the flow out oropharynx simulator output 312 to a trachea module. A trachea module receives the flow from the oropharynx module and directs the flow to a lung module (606). For example, trachea simulator input 410 receives a flow of particles from oropharynx simulator output 312 and directs the flow through trachea simulator 400. The physical properties of the particles may be affected by cavity lining 420 and trachea cavity temperature control 460 as they travel through trachea simulator 400. Trachea cavity shape and dimensions 450 may affect the path of travel of the particles causing the particles to interact with cavity lining 420 and cavity temperature control 460 in a manner simulating a respiratory system. Trachea simulator 400 directs the flow out trachea simulator output 412 to a lung module. A lung module receives a flow of particles from the trachea module, divides the flow of particles into a plurality of flows over successive generations, and directs the flow out to a sample chamber (608). For example, lung simulator input 510 receives a flow of particles from trachea simulator output 412 and directs the flow through bronchial tree structure 580. Bronchial tree structure 580 divides the flow of particles into a plurality flows by directing the flows through first through $N^{th}$ generations 571-579. Lung simulator 500 directs the plurality of flow out lung simulator output 512 to a sample chamber. The sample chamber receives the plurality of divided flows from the lung module for analysis (610).

Figure 7A:
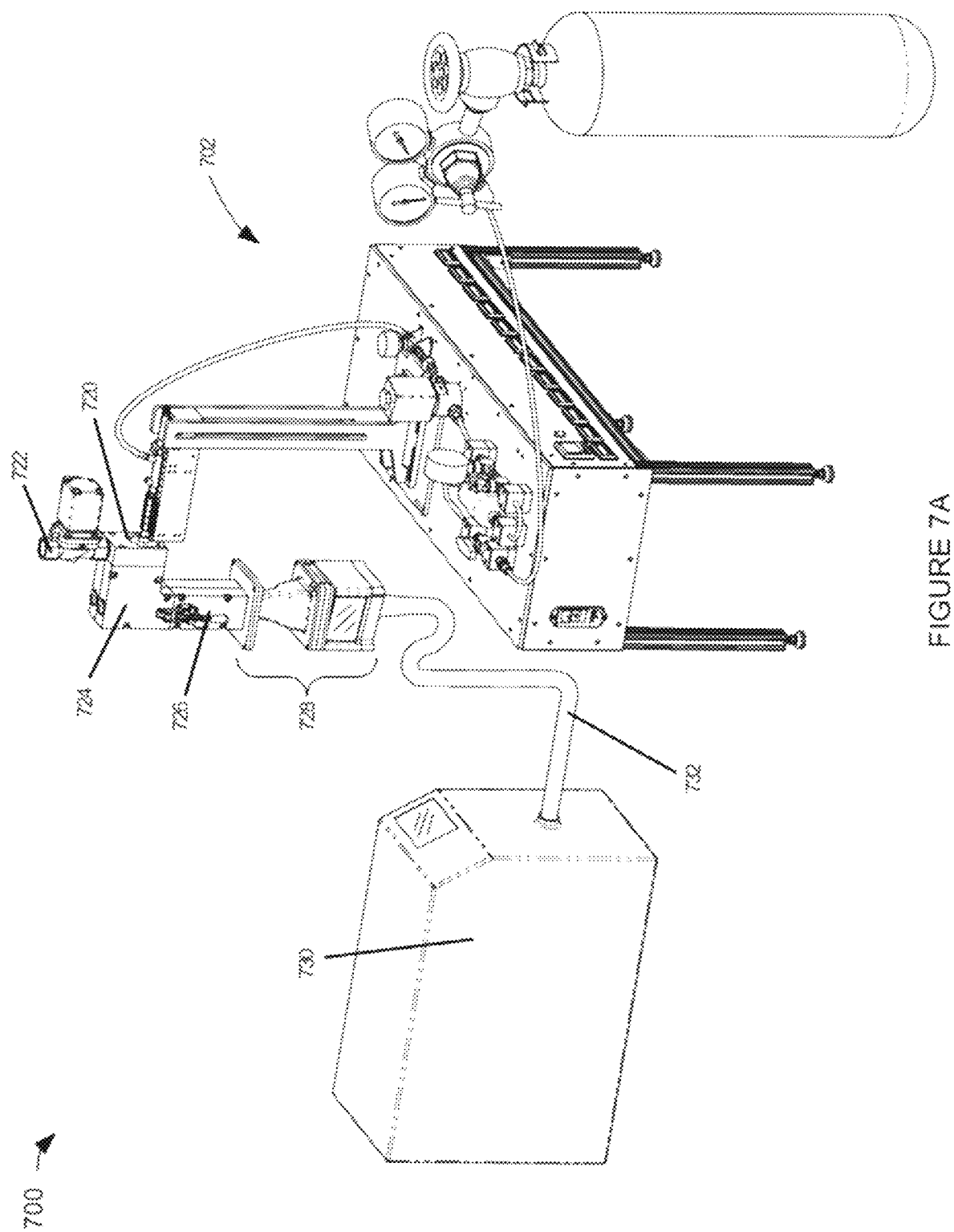
FIG. 7A is a diagram illustrating a respiratory system simulator.

FIG. 7A is a diagram illustrating respiratory system simulator 700A. Respiratory system simulator 700A comprises mouth simulator 720, nose simulator 722, throat simulator 724, trachea simulator 726, lung simulator 728, breath simulator 730 and breath simulator interface 732. Prototype inhaler 702 is illustrated to show an embodiment of respiratory system simulator 700A in typical operation. Prototype inhaler 702 may comprises a thermally regulated aerosol generator (TRAG), metered dose inhaler, aerosol inhaler, dry powder inhaler or some other type of inhaler yet to be invented. Mouth, nose, throat, trachea and lung simulator 720-728 are configured to simulate the pathway and environment of a respiratory system. Respiratory system simulator 700A may include temperature controllers to maintain respiratory system simulator 700A at or near body temperature. The internal cavities of respiratory system simulator 700A may be coated with a cavity lining. Breath simulator 730 can simulate a variety of breathing patterns through respiratory system simulator 700A by controlling pressure, velocity, and timing of a flow through respiratory system simulator 700A.

Figure 7B:
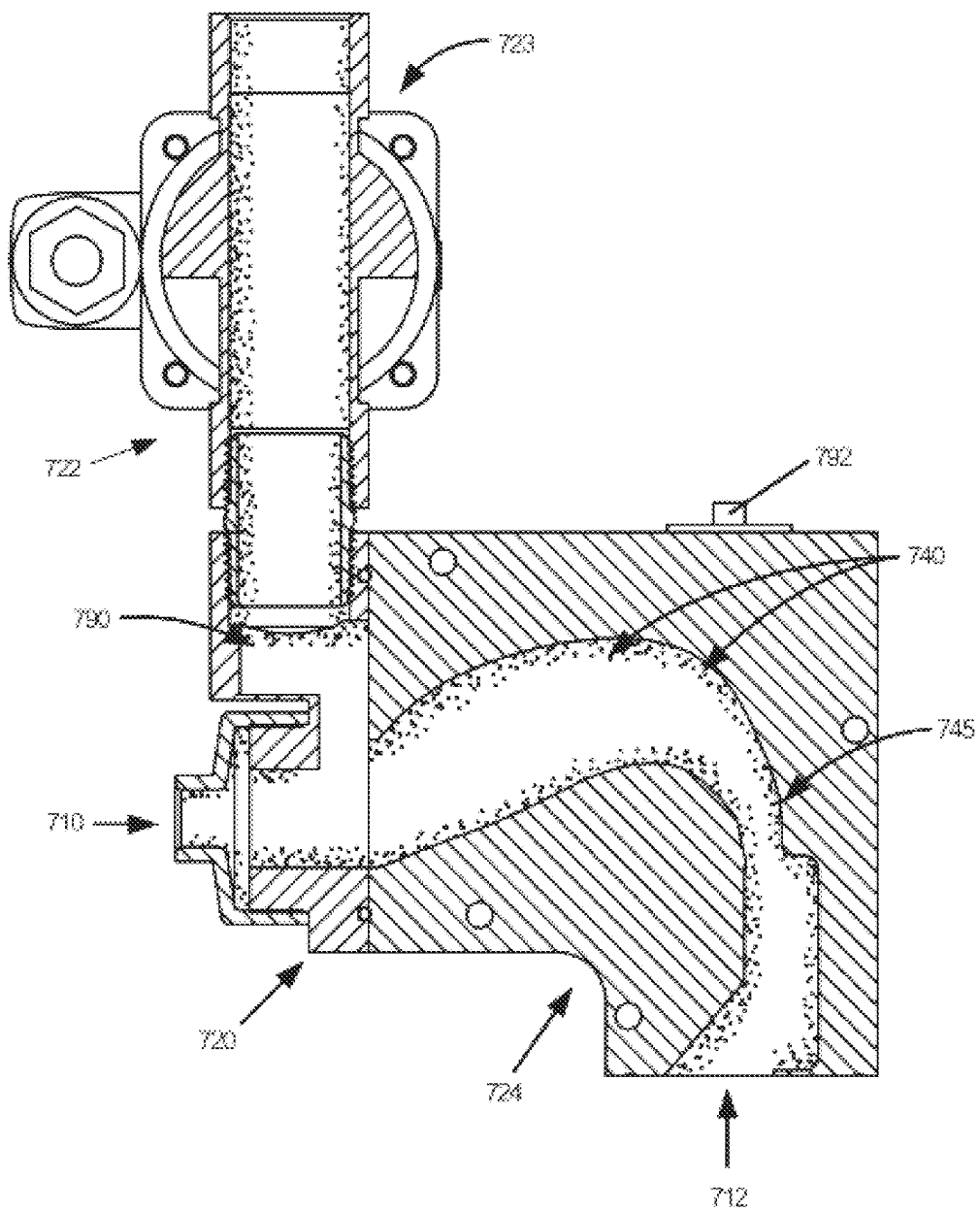
FIG. 7B is a diagram illustrating a mouth and throat simulator assembly.

FIG. 7B is a diagram illustrating mouth and throat simulator assembly 700B. Mouth and throat simulator assembly 700B includes mouth simulator 720, nose simulator 722, throat simulator 724 and temperature controller 792. Mouth simulator 720 is a modular component of mouth and throat simulator assembly 700B configured to allow easy replacement with alternative embodiments of mouth simulator 720 depending upon test requirements. Mouth simulator 720 includes shapes and dimensions to simulate a mouth. Mouth simulator 720 is configured to couple to nose simulator 722 and throat simulator 724 and receive particles at mouth simulator input 710, and possibly ambient air 790, via nose simulator 722. Mouth simulator 720 may be coated with cavity lining 740.

Mouth and throat simulator assembly 700B includes nose simulator 722. Nose simulator 722 is configured to be a modular component of mouth and throat simulator assembly 700B so that alternative embodiments of nose simulator 722 may be easily substituted depending upon test requirements. Nose simulator 722 is configured to simulate the operation of a nasal cavity and includes shapes and dimensions that simulate a nasal cavity. Nose simulator 722 includes a first port on a distal end configured to interface with ambient air 790 and a second port on a proximal end configured to control the flow of ambient air 790 into or out of mouth simulator 720. Nose simulator 722 includes ambient air bypass 723. Ambient air bypass 723 may include a valve or regulator to control the direction and flow rate of ambient air 790 within nose simulator 722. The valve or regular may comprise a mechanical valve or regulator or an electronically operated valve or regulator, or some other device configured to control ambient air flow. Ambient air bypass 723 may operate in a manner similar to the way a soft pallet blocks a nasal cavity from a throat cavity by blocking ambient air flow through nose simulator 722.

Mouth and throat simulator assembly 700B includes throat simulator 724. Throat simulator 724 is configured to be a modular component of mouth and throat simulator assembly 700B so that alternative embodiments of throat simulator 724 may be easily substituted depending upon test requirements. Throat simulator 724 is configured to affect particles traveling through it in a manner simulating a throat. Throat simulator 724 includes shapes, dimensions, and environmental conditions configured to affect the physical properties of particles traveling through mouth and throat simulator assembly 700B in a manner similar to a mouth and throat. Throat simulator 724 comprises an oral cavity and a pharyngeal cavity defined by inner surface 745 configured to simulate an oral and pharyngeal cavity. Inner surface 745 may be coated with cavity lining 740. Throat simulator 724 is configured to couple to mouth simulator 720.

Mouth and throat simulator assembly 700B includes temperature controller 792. Temperature controller 792 is configured to maintain the internal cavity temperature of mouth and throat simulator assembly 700B at or near body temperature. Temperature controller 792 includes one or more heaters, a means to measure the temperature of mouth and throat simulator assembly 700B, and a means to control the output of the one or more heaters based on the temperature measurements. The means to measure temperature may comprise thermocouples, thermistors, resistance temperature detectors, and infrared or other non-contact means to measure temperature. The means to control the heat source may comprise a temperature controller, a proportional-integral-derivative (PID) controller, programmable logic controller (PLC), computer, thermostat or some other means capable of adjusting the output of a heater based on temperature measurements.

Figure 7C:
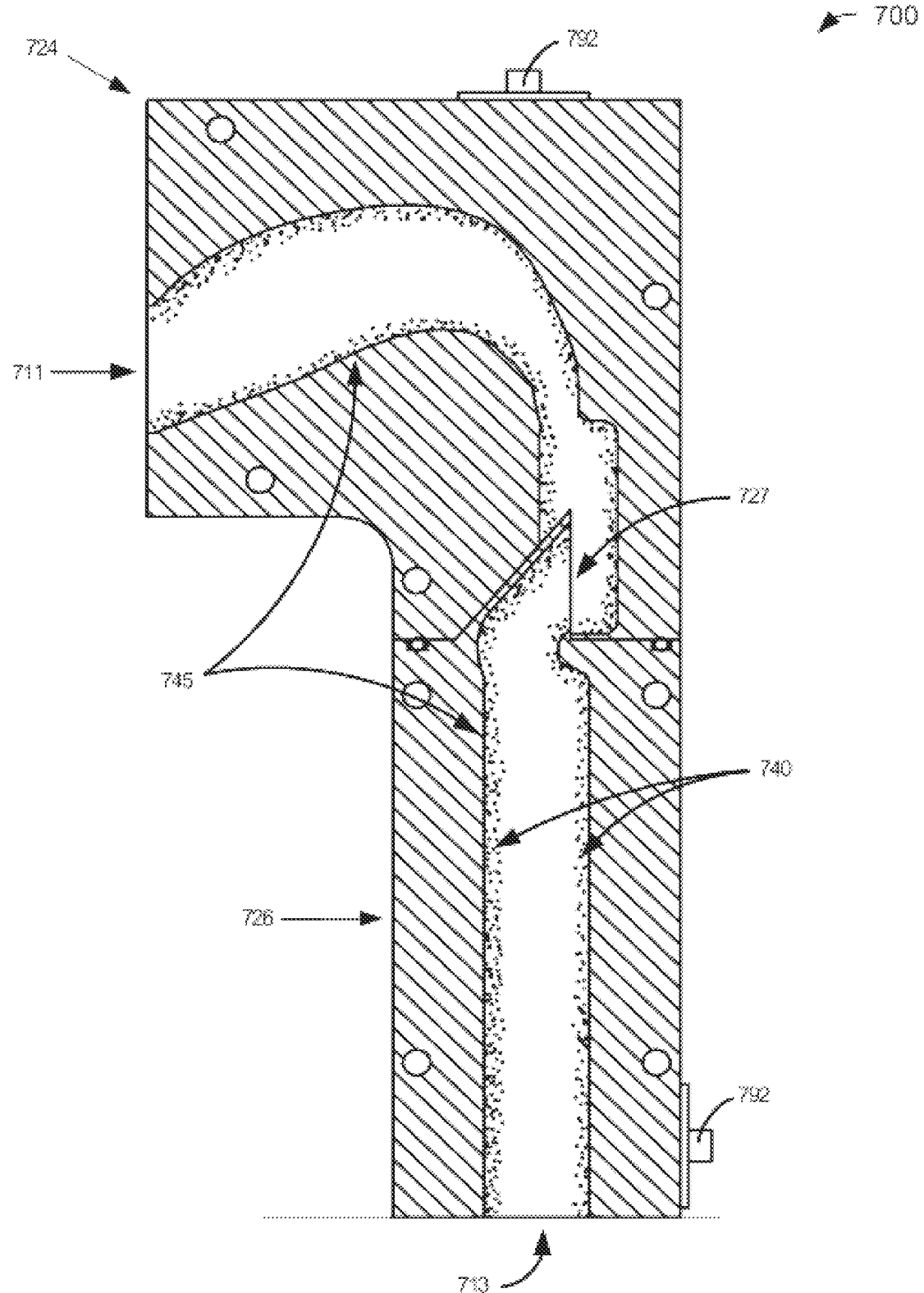
FIG. 7C is a diagram illustrating a throat and trachea simulator assembly.

FIG. 7C is a diagram illustrating throat and trachea simulator assembly 700C. Throat and trachea simulator assembly 700C includes throat simulator 724, trachea simulator 726 and temperature controller 792. Throat simulator 724 and trachea simulator 726 include inner surface 745, which may be coated with cavity lining 740 to simulate the humidity of a respiratory system. Temperature controller 792 is configured to maintain throat and trachea simulator assembly 700C at or near body temperature.

Throat and trachea simulator assembly 700C includes throat simulator 724. Throat simulator 724 is configured to be a modular component of throat and trachea simulator assembly 700C to allow alternative embodiments of throat simulator 724 to be substituted depending upon test requirements. Throat simulator 724 includes throat simulator input 711 configured to receive a flow of particles and an output 712 (see also FIG. 7B) configured to communication a flow of particles to the next assembly of the respiratory system simulator (e.g., the trachea simulator 720). Throat simulator 724 is configured to affect particles traveling through it in a manner simulating a throat. Throat simulator 724 includes shapes, dimensions, and environmental conditions configured to affect the physical properties of particles traveling through throat and trachea simulator assembly 700C in a manner similar to a throat. Throat simulator 724 is configured to couple to trachea simulator 726.

Throat and trachea simulator assembly 700C includes trachea simulator 726. Trachea simulator 726 is configured to be a modular component of throat and trachea simulator assembly 700C to allow alternative embodiments of trachea simulator 726 to be substituted depending upon test requirements. Trachea simulator 726 includes larynx simulator 727. Larynx simulator 727 includes shapes and dimensions configured to simulate a larynx. Larynx simulator 727 is configured to receive a flow of particles from throat simulator 724. Larynx simulator 727 directs the received flow of particles from throat simulator 724 to trachea simulator 726. Larynx simulator 727 is configured to affect particles traveling through it in a manner simulating a larynx. Trachea simulator 726 includes shapes, dimensions, and environmental conditions configured to affect the physical properties of particles traveling through throat simulator 724 and trachea simulator 726 in a manner similar to a trachea. Trachea simulator 726 is configured to couple to throat simulator 724.

Throat and trachea simulator assembly 700C includes temperature controller 792. Temperature controller 792 is configured to maintain the internal cavity temperature of throat and trachea simulator assembly 700C at or near body temperature. Temperature controller 792 includes one or more heaters, a means to measure the temperature of throat and trachea simulator assembly 700C, and a means to control the output of the one or more heaters based on the temperature measurements. The means to measure temperature may comprise thermocouples, thermistors, resistance temperature detectors, and infrared or other non-contact means to measure temperature. The means to control the heat source may comprise a temperature controller, a proportional-integral-derivative (PID) controller, programmable logic controller (PLC), computer, thermostat, or some other means capable of adjusting the output of a heater based on temperature measurements.

Figure 7D:
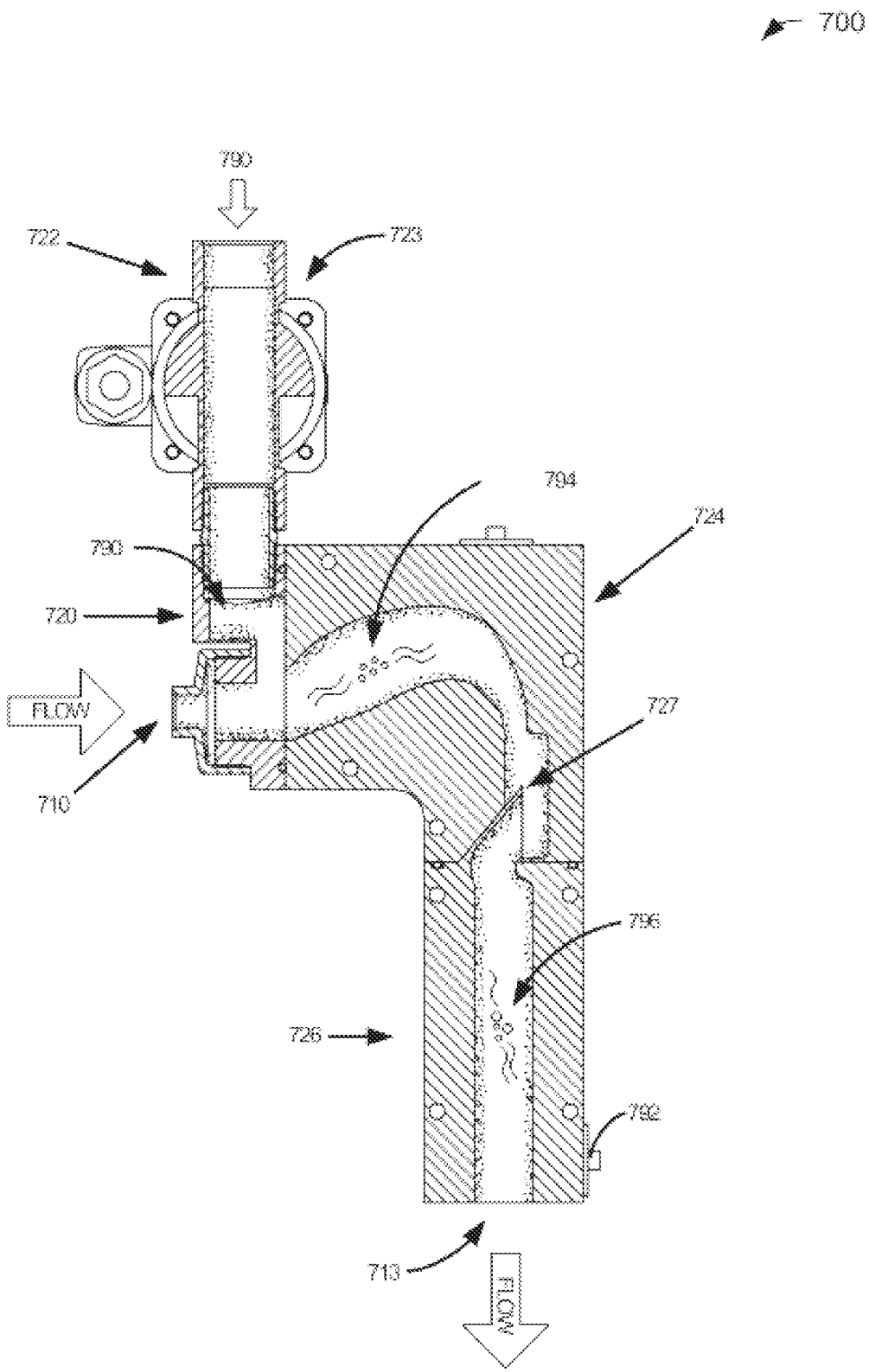
FIG. 7D is a diagram illustrating the operation of a upper respiratory system simulator assembly.

FIG. 7D is a diagram illustrating the operation of upper respiratory system simulator assembly 700D. Upper respiratory system simulator assembly 700D includes mouth simulator 720, nose simulator 722, throat simulator 724, trachea simulator 726, larynx simulator 727 and temperature controller 792. Upper respiratory system simulator assembly 700D is maintained at or near body temperature by temperature controller 792. The interior cavities of upper respiratory system simulator assembly 700D may be coated with a cavity lining.

In operation, upper respiratory system simulator assembly 700D couples to a breath simulator configured to simulate various breathing patterns. Temperature controller 792 maintains the temperature of upper respiratory system simulator assembly 700D at or near body temperature. The breath simulator creates a simulated breath drawing a flow of particles 790 into mouth simulator input 710. Mouth simulator input 710 receives the flow of particles 790 and directs it to mouth simulator 720. Nose simulator 722 may activate ambient air bypass 723, depending upon test requirements, and combine ambient air with the flow of particles 790 received by mouth simulator input 710. The flow is directed to throat simulator 724. The physical properties of particles 794 may be affected by the environmental conditions, shapes and dimensions of mouth simulator 720, nose simulator 722 and throat simulator 724. Throat simulator 724 directs particles 754 to larynx simulator 727. Larynx simulator 727 directs the flow to trachea simulator 726. Particles 756 may be further affected by the environmental conditions, shapes, and dimensions of larynx simulator 727 and trachea simulator 726. Particles 796 exit upper respiratory system simulator assembly 700D at lower lung simulator output 713.

Figure 7E:
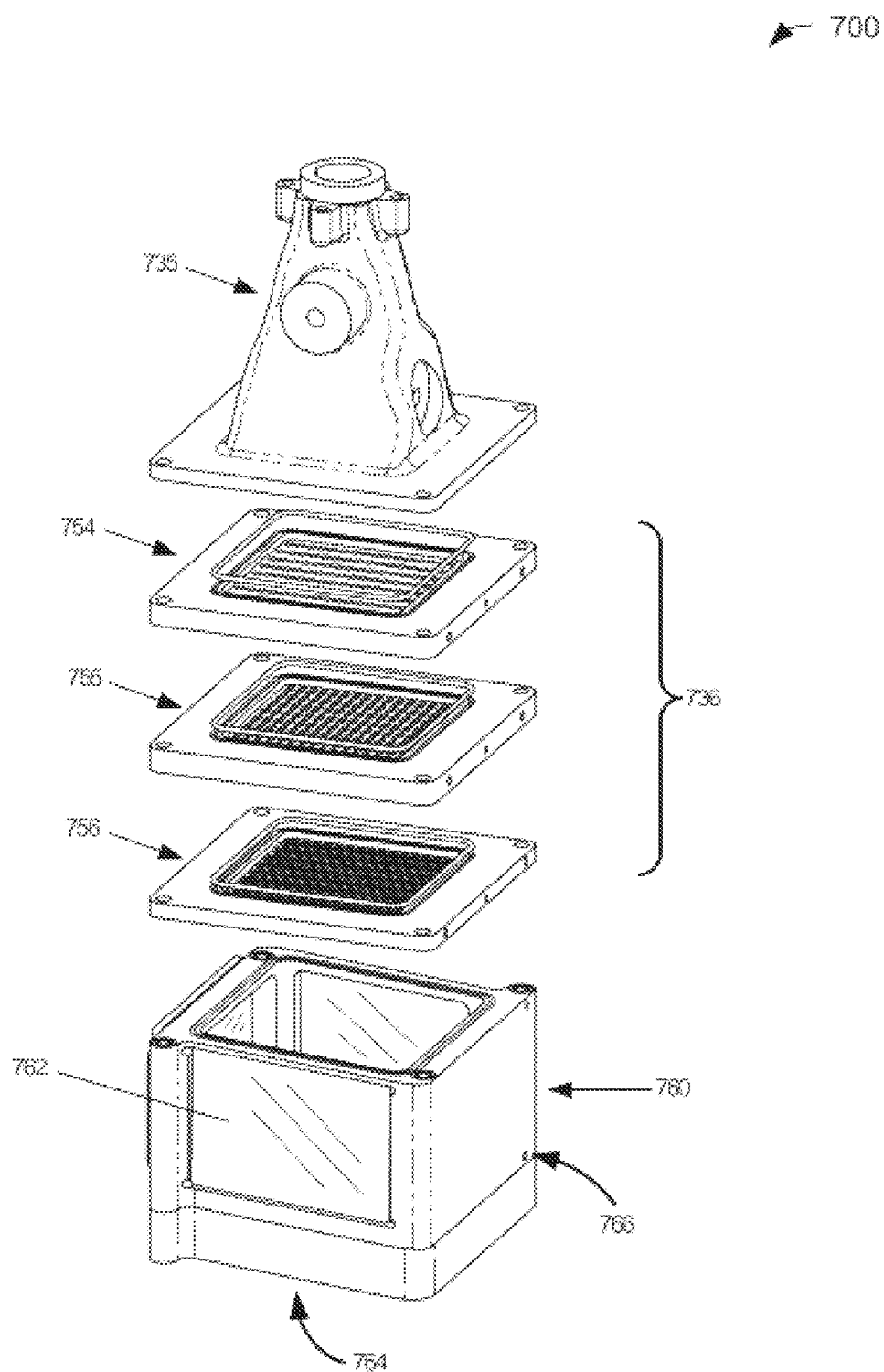
FIG. 7E is a diagram illustrating a lung simulator assembly.
Figure 7F:
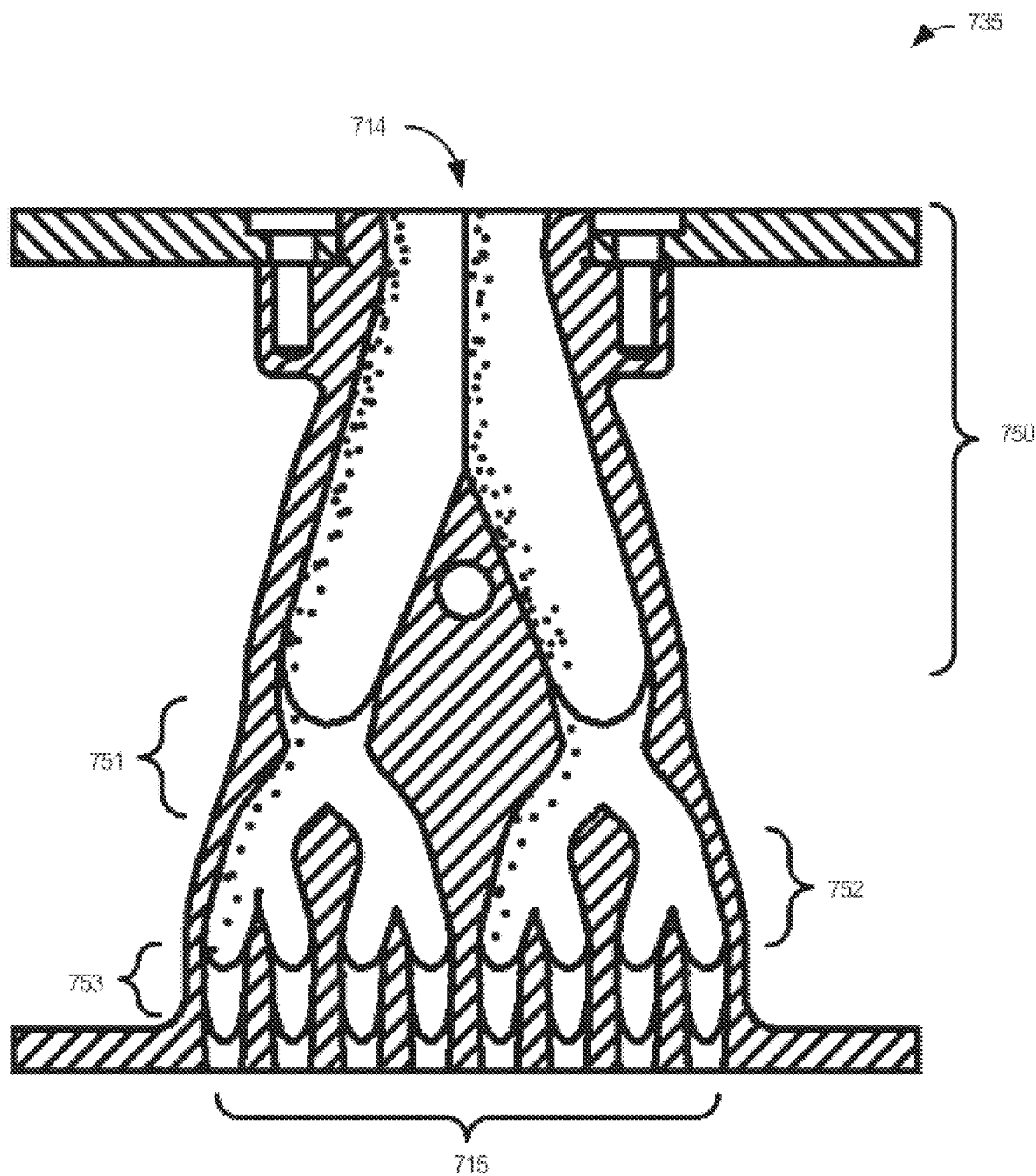
FIG. 7F is a cross-sectional diagram illustrating an upper lung simulator assembly.

FIG. 7E is a diagram illustrating lung simulator assembly 700E. Lung simulator assembly 700E includes an upper lung simulator 735 that includes an upper lung simulator input 714, a first bronchi generation 750 (FIG. 7F), a second bronchi generation 751 (FIG. 7F), a third bronchi generation 752752 (FIG. 7F), and a fourth bronchi generation 753 (FIG. 7F). Lung simulator assembly 700E also includes a lower lung simulator 736 and a sampling chamber 760. Upper lung simulator 735 is configured to be a modular component of lung simulator assembly 700E allowing alternative embodiments of upper lung simulator 735 to be easily substituted depending upon test requirements. Upper lung simulator 735 is configured to receive a flow comprising aerosol or powder particles. Upper lung simulator 735 includes at least one temperature controller to maintain upper lung simulator 735 at or near body temperature. Upper lung simulator 735 includes inner cavities that may be coated with a cavity lining to simulate the environment of an upper lung. Upper lung simulator 735 includes a bronchial tree structure to receive and divide a flow of particles into a plurality of flows with each successive generation. Upper lung simulator 735 includes shapes and dimensions configured to simulate bronchus.

Figure 7G:
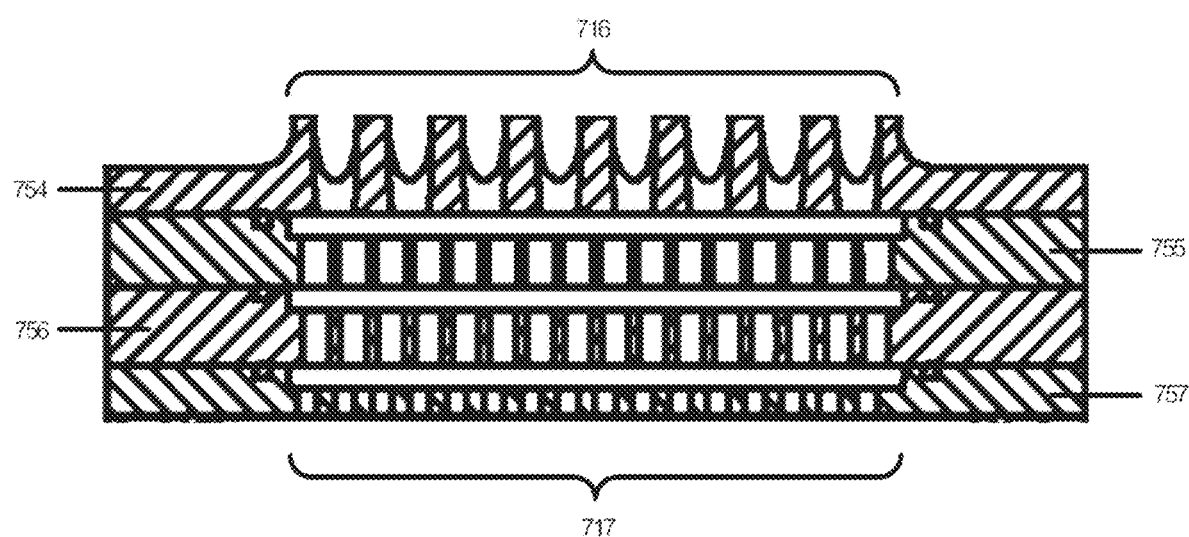
FIG. 7G is a cross-sectional diagram illustrating a lower lung simulator assembly.

Lung simulator assembly 700E includes lower lung simulator 736. Lower lung simulator 735 comprises a plurality of bronchial tree simulation plates 754-756 configured to be a modular component of lower lung simulator 736 so that alternative embodiments of bronchial tree simulation plates 754-756 may be easily substituted depending upon test requirements. A first bronchial tree simulation late 754 represents a first bronchiole generation and comprises a first perforated plate having a first plurality of passageways configured to simulate a first lower lung bronchial airway generation. A second bronchial tree simulation plate 755 represents a second bronchiole generation and comprises a second perforated plate having a second plurality of passageways configured to simulate a second lower lung bronchial airway generation. As shown in FIG. 7G, the second plurality of passageways of second bronchial tree simulation plate 756 is configured to be offset from the first plurality of passageways of first bronchial tree simulation plate 754 such that the flow of the particles from each exit of each of the first plurality of passageways is divided into a plurality of flows before entering each entrance of each of the second plurality of passageways. A third bronchial tree simulation plate 756 represents a third bronchiole generation and comprises a third perforated plate having a third plurality of passageways. As shown in FIG. 7G, the third plurality of passageways of third bronchial tree simulation plate 756 is configured to be offset from the second plurality of passageways of second bronchial tree simulation plate 755 such that the flow of the particles from each exit of each of the second plurality of passageways of second bronchial tree simulation plate 755 is further divided into a plurality of flows before exiting third bronchial tree simulation plate 756. First through third bronchial tree simulation plate 754-756 may be coated with a cavity lining simulating the environment of a lower lung.

Lung simulator assembly 700E includes sampling chamber 760. Sampling chamber 760 comprises sampling window 762, breath simulator interface 764 and humidity sampling port 766. Sampling window 762 is configured to allow optical analysis of particles. In an embodiment, a particle analyzer may be used to characterize particle size distribution. In an embodiment, the particle analyzer may be configured to utilize laser diffraction to measure the size and distribution of the particles. The laser may be transmitted through sampling window 762. Sampling window 762 may be manufactured from glass, plastics, polymers or some other material having desirable optical properties.

Breath simulator interface 764 is configured to couple sampling chamber 760 to a breath simulator. The breath simulator is configured to simulate different breathing patterns and controls the flow of particles within lung simulator assembly 700E. Breath simulator interface 764 may comprise any means to couple sampling chamber 760 to a breath simulator while maintaining a pressure-tight seal. Some examples of breath simulator interface 764 may include mechanical fasteners, hose clamps, barbed fittings, quick-disconnect fittings, or some other means to couple sampling chamber 760 to a breath simulator. Humidity sampling port 760 is configured to receive a humidity sensor to measure the humidity levels within sampling chamber 760.

In operation, a breath simulator configured to simulate various breathing patterns is coupled to lung simulator assembly 700E. The breath simulator may control the pressure, velocity, and timing of a flow of particles through lung simulator assembly 700E. The flow is drawn through upper lung simulator 735 by a breath simulator before entering lower lung simulator 736. The flow is received by lower lung simulator 736 and further divided into a plurality of flows by first bronchial tree simulation plate 754 and further divided by second and third bronchial tree simulation plates 755 and 756 before being directed to sampling chamber 760. The physical properties of the particles may be affected by the environmental conditions and course of travel as they pass through lung simulator assembly 700E. Sampling chamber 760 receives the flows of divided FIG. 7F is a cross-sectional diagram illustrating upper lung simulator assembly 700F. Upper lung simulator assembly 700F includes first bronchi generation 750, second bronchi generation 751, third bronchi generation 752 and fourth bronchi generation 753. Bronchus generations 750-753 are configured to be modular components of upper lung simulator assembly 700F so that alternative embodiments of bronchus generations 750-753 may be easily substituted depending upon test requirements. Upper lung simulator assembly 700F includes upper lung simulator input 714 configured to receive a flow of particles. Fourth bronchi generation 753 includes upper lung simulator output 715 configured to output a plurality of divided flows of particles. Bronchus generations 750-753 may be coated with a cavity lining to simulate the environment within lungs. Upper lung simulator assembly 700F may include a temperature controller to maintain upper lung simulator assembly 700F at or near body temperature.

FIG. 7G is a cross-sectional diagram illustrating lower lung simulator assembly 700G. Lower lung simulator assembly 700G includes first bronchial tree simulation plate 754, second bronchial tree simulation plate 755, third bronchiole generation bronchial tree simulation plate 756, and fourth bronchial tree simulation plate 757. First through fourth bronchial tree simulation plates 754-757 are configured to be modular components of lower lung simulator assembly 700G so that alternative embodiments of first through fourth bronchial tree simulation plates 754-757 may be easily substituted depending upon test requirements. First bronchial tree simulation plate 754 through fourth bronchial tree simulation plate 757 may be coated with a cavity lining to simulate environment conditions within a lung. Lower lung simulator assembly 700G may include a temperature controller to maintain the temperature of lower lung simulator assembly 700G at or near body temperature.

Lower lung Simulator 752 includes a plurality of bronchial tree simulation plate 754-757. Bronchial tree simulation plates 754-757 may include alignment features configured to physically locate bronchiole tree simulation plates 754-757 in relation to one another such that the passageways of bronchial tree simulation plates 754-757 are properly aligned.

First bronchial tree simulation plate 754 comprises a plate including a lower lung simulator input 716 and having a first plurality of passageways configured such that a flow of particles is divided into a plurality of flows before entering second bronchial tree simulation plate 755. The plurality of flows from each exit of each of the first plurality of passageways of first bronchial tree simulation plate 754 is directed to second bronchial tree simulation plate 755. Second bronchial tree simulation plate 755 comprises a second perforated plate having a second plurality of passageways configured to simulate a second lower lung bronchial airway generation. The second plurality of passageways of second bronchial tree simulation plate 755 is configured to be offset from the first plurality of passageways of first bronchial tree simulation plate 754 such that the divided flows of particles from each exit of each of the first plurality of passageways is further divided into a plurality of flows before entering each entrance of each of the second plurality of passageways of second bronchial tree simulation plate 755. Third bronchial tree simulation plate 756 comprises a third perforated plate having a third plurality of passageways configured to simulate a third bronchiole generation of a lung. The third plurality of passageways of third bronchial tree simulation plate 756 is configured to be offset from the second plurality of passageways of second bronchial tree simulation plate 755 such that the plurality of divided flows from each exit of each of the second plurality of passageways of second bronchial tree simulation plate 755 is further divided into a plurality of flows comprising second generation particles before entering third bronchial tree simulation plate 756. A third plurality of divided flows exits third bronchial tree simulation plate 756. Fourth bronchial tree simulation plate 757 further divides the pluralities of divided flow similarly to first through third bronchial tree simulation plates 754-756 before outputting the flows via lower lung simulator output 717. It should be understood that lower lung simulator assembly 700G is not limited four bronchial tree simulation plates 754-757, as illustrated in FIG. 7G. Lower lung simulator assembly 700G may comprise any number of bronchial tree simulation plates and, thus, any member of bronchiole generations.

Figure 7H:
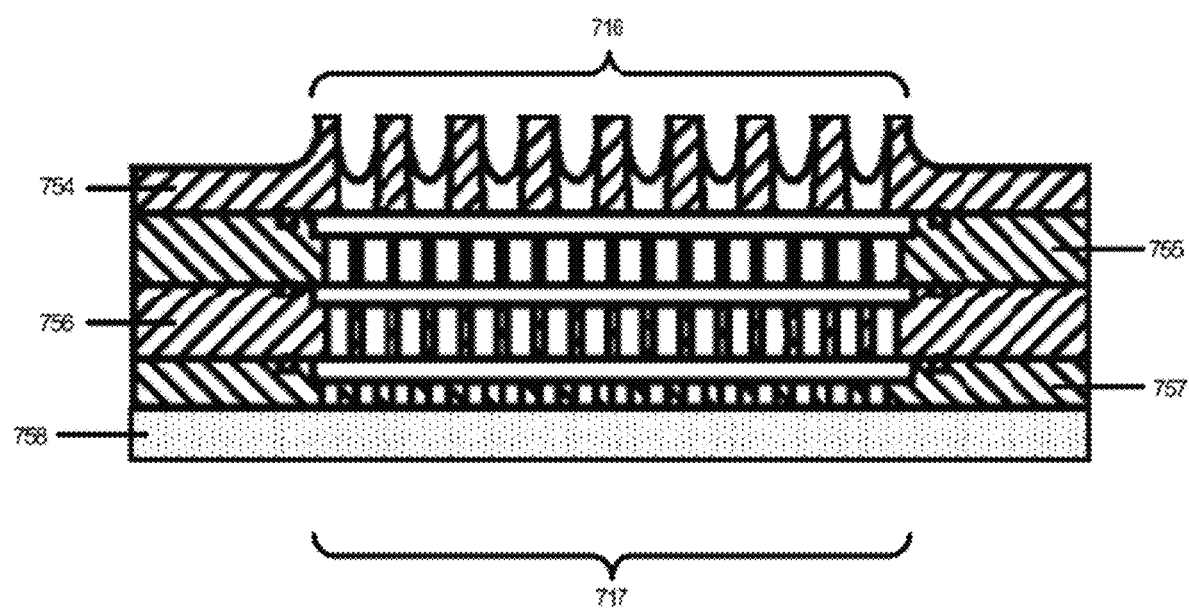
FIG. 7H is a cross-sectional diagram illustrating a lower lung simulator assembly.

FIG. 7H is a cross-sectional diagram illustrating lower lung simulator assembly 700. As illustrated in FIG. 7H, lower lung simulator assembly includes biofilm 758. Biofilm 758 is configured to simulate the environmental conditions within the lower lung. Biofilm 758 is comprised of cavity lining. Therefore, biofilm 758 is capable of supporting living microorganisms. Biofilm 758 is coupled to fourth bronchial tree simulation tree plate 757. In some embodiments, biofilm 758 may comprise a matrix structure. The matrix structure may comprise a plurality of cylindrical hollow segments configured to simulate bronchiole.

In some embodiments, biofilm 758 may be made using a three-dimensional bioprinting process. Three-dimensional bioprinting may be used to fabricate biological constructs. Three-dimensional bioprinting typically involves dispensing cells onto a biocompatible scaffold using a successive layer-by-layer approach to generate tissue-like three-dimensional structures. Thus, biofilm 758 may include a variety of geometric configurations to simulate various parts of the respiratory system.

Figure 8A:
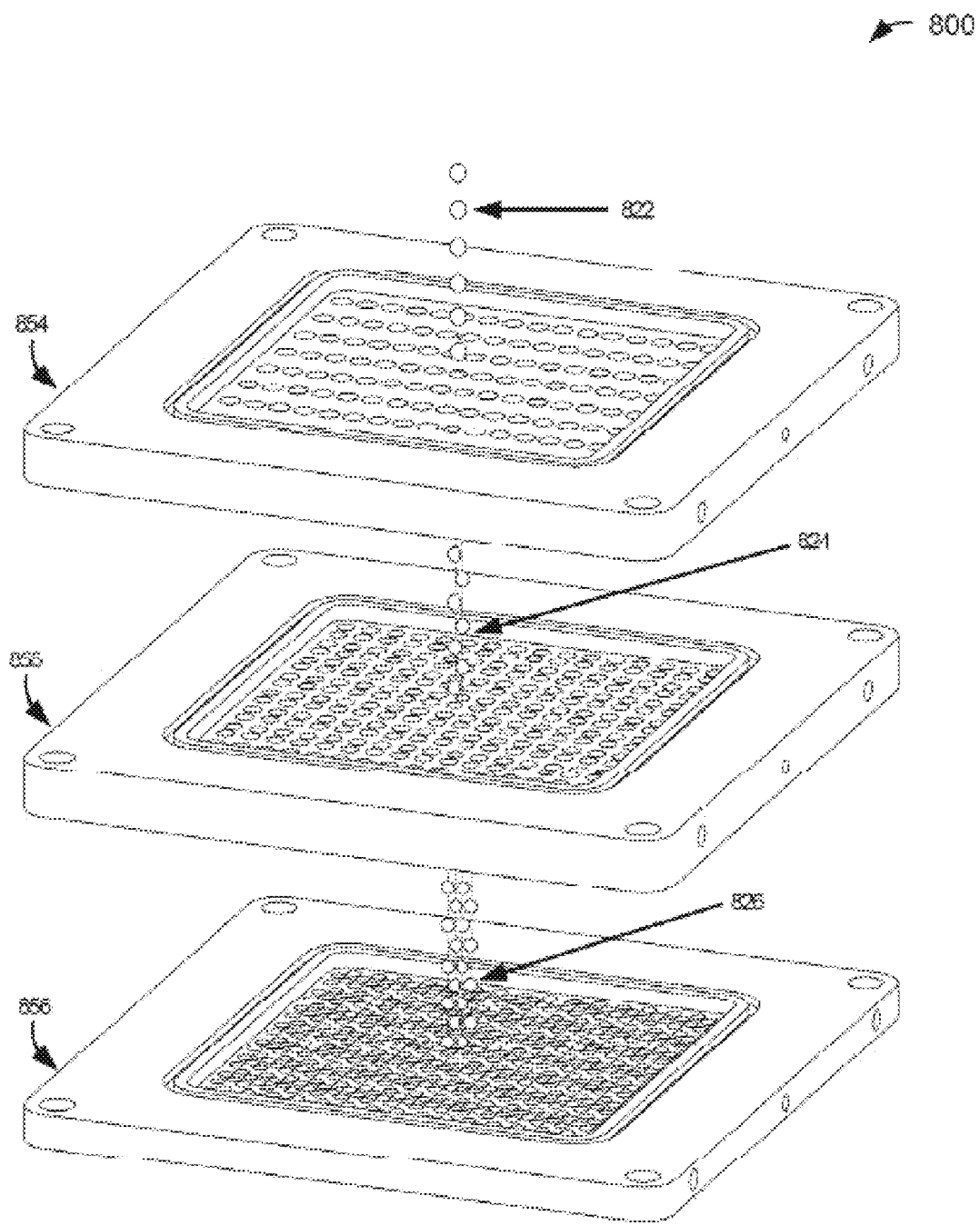
FIG. 8A is a diagram illustrating the operation of a lower lung simulator assembly.

FIG. 8A is a diagram illustrating the operation of a lower lung simulator assembly 800. Lower lung simulator assembly 800 is an example of lower lung simulator assembly 700G; however, lower lung simulator assembly 800 may have alternative configurations and methods of operation. Lower lung simulator assembly 800 includes first bronchiole generation 854, second bronchiole generation 855 and third bronchiole generation 856.

In operation, first through third bronchiole generations 854-856 may be coated with a cavity lining to simulate the environment within the lungs. Lower lung simulator assembly 800 may be maintained at a temperature at or near body temperature.

First bronchiole generation 854 receives a flow of particles 822. The first plurality of passageways of first bronchiole generation 854 is configured such that the flow of particles 822 is divided into a plurality of flows of first generation particles 824 before entering second bronchiole generation 855. The plurality of flows of first generation particles 824 from each exit of each of the first plurality of passageways of first bronchiole generation 854 is directed to third bronchiole generation 856. Second bronchiole generation 855 comprises a second perforated plate having a second plurality of passageways offset from the first plurality of passageways of first bronchiole generation 854, causing first generation particles 824 from each exit of each of the first plurality of passageways to be divided into second generation particles 826 before entering each entrance of each of the third plurality of passageways of third bronchiole generation 856. Third bronchiole generation 856 further divides second generation particles 826 and directs the divided flows to a lower lung simulator output.

Figure 8B:
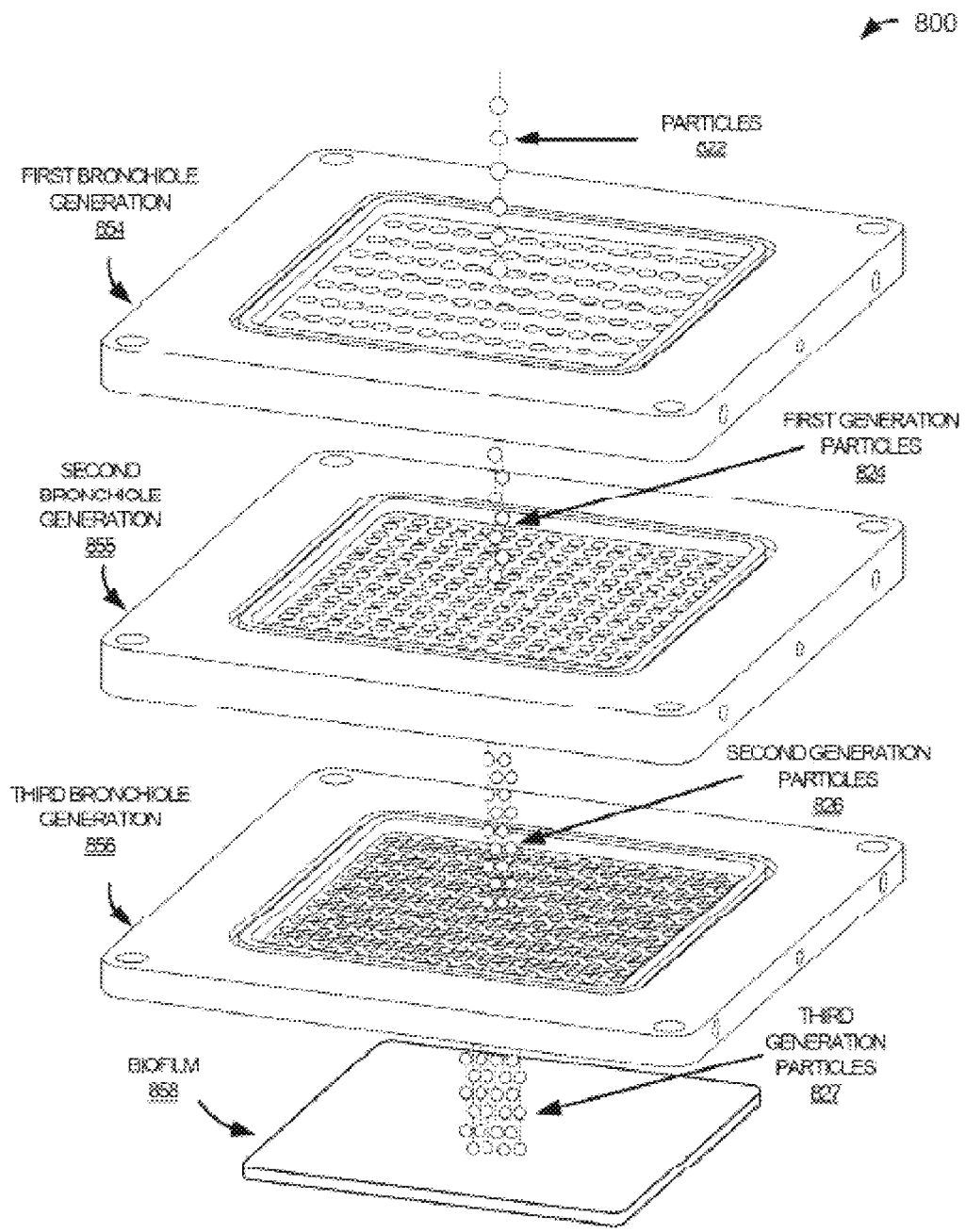
FIG. 8B is a diagram illustrating the operation of a lower lung simulator assembly.
Figure 9A:
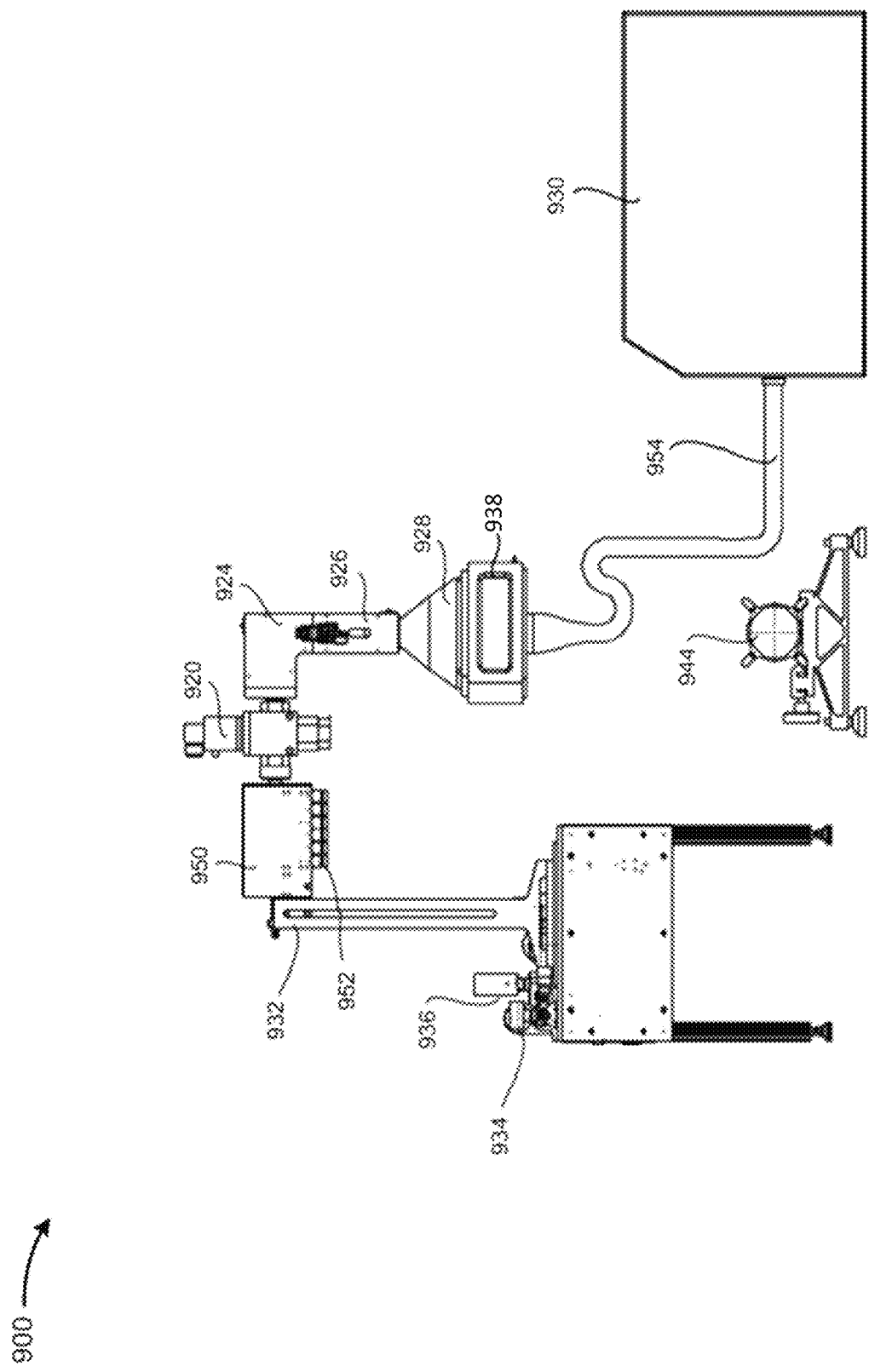
Figure 9B:
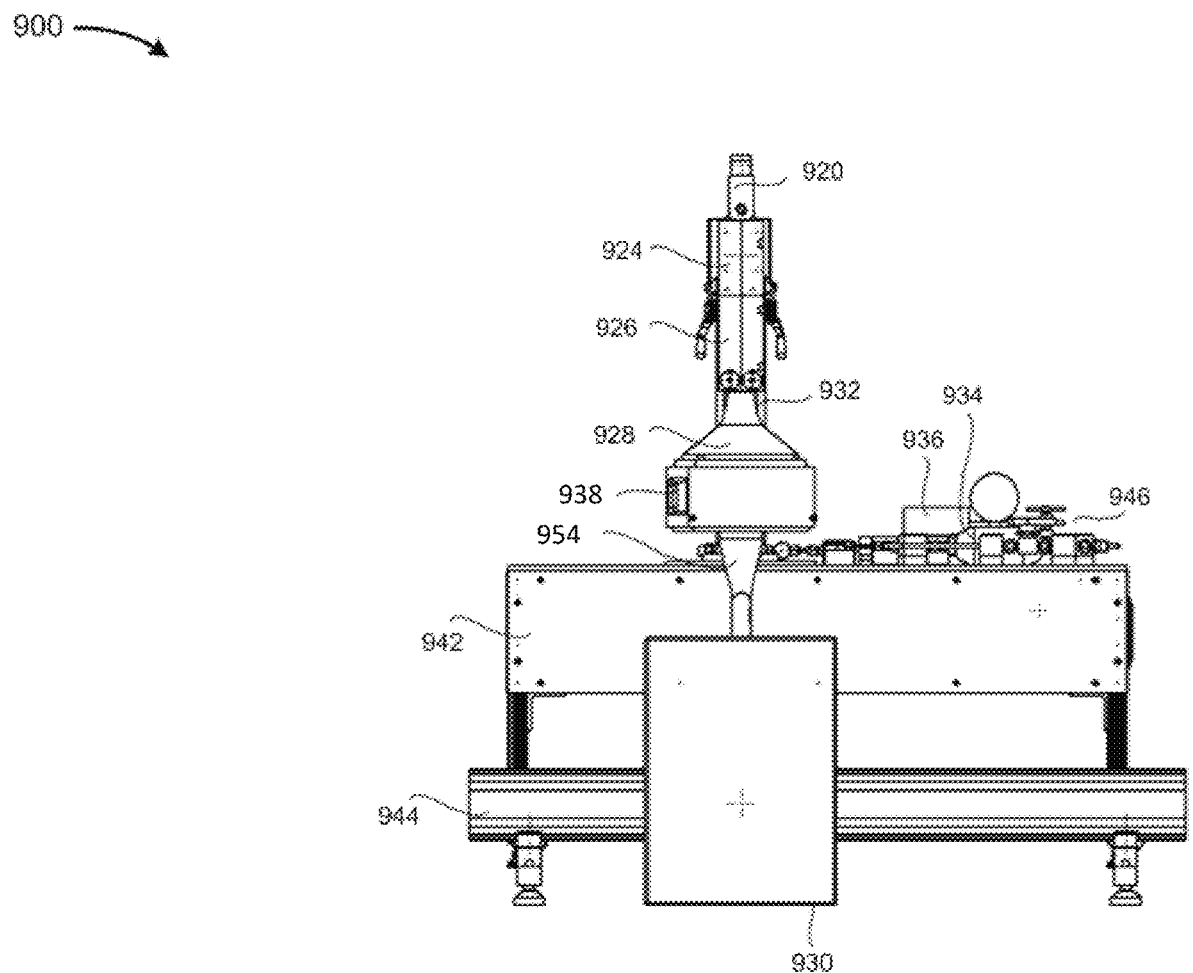
Figure 9C:
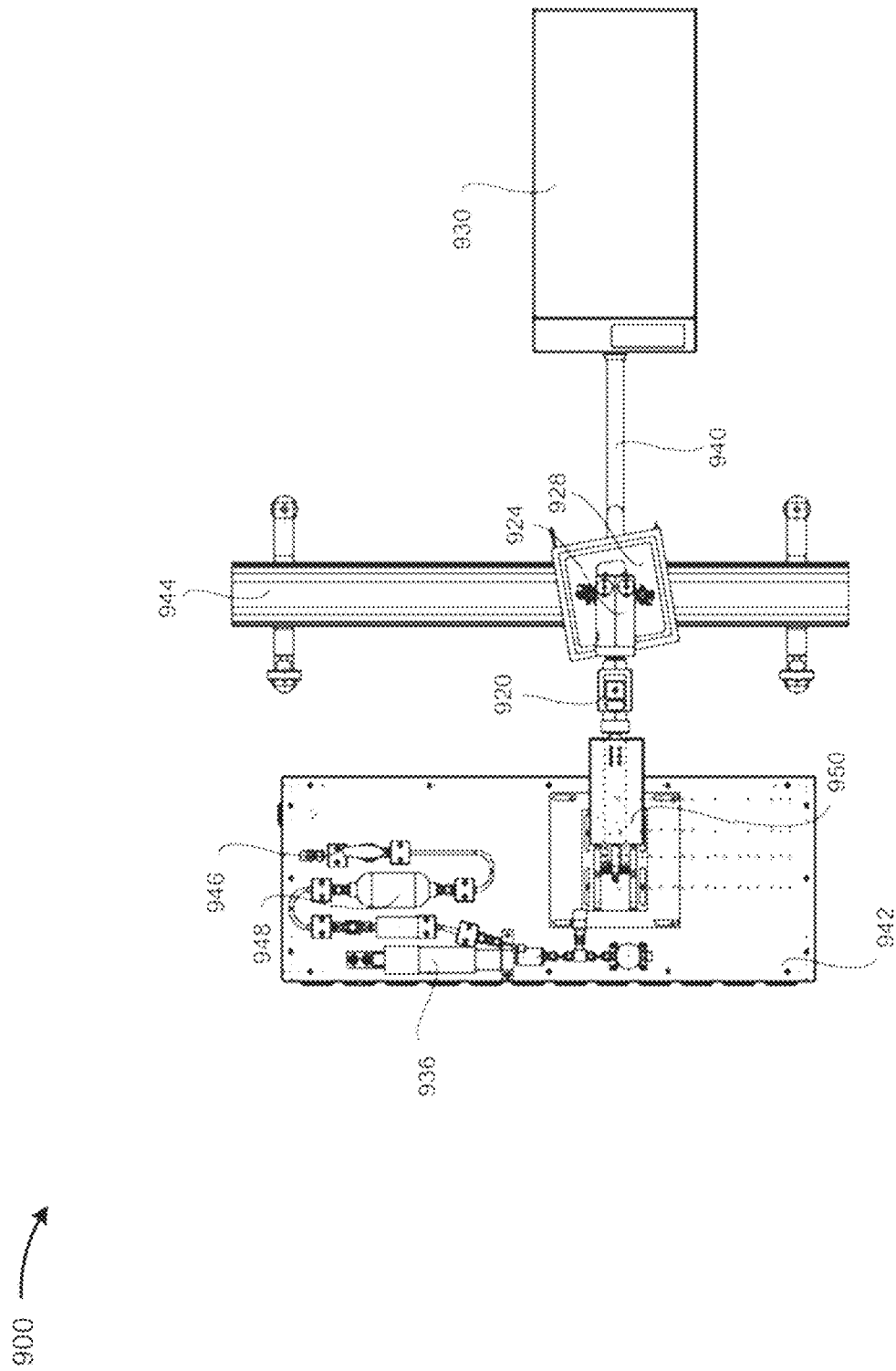
Figure 9D:
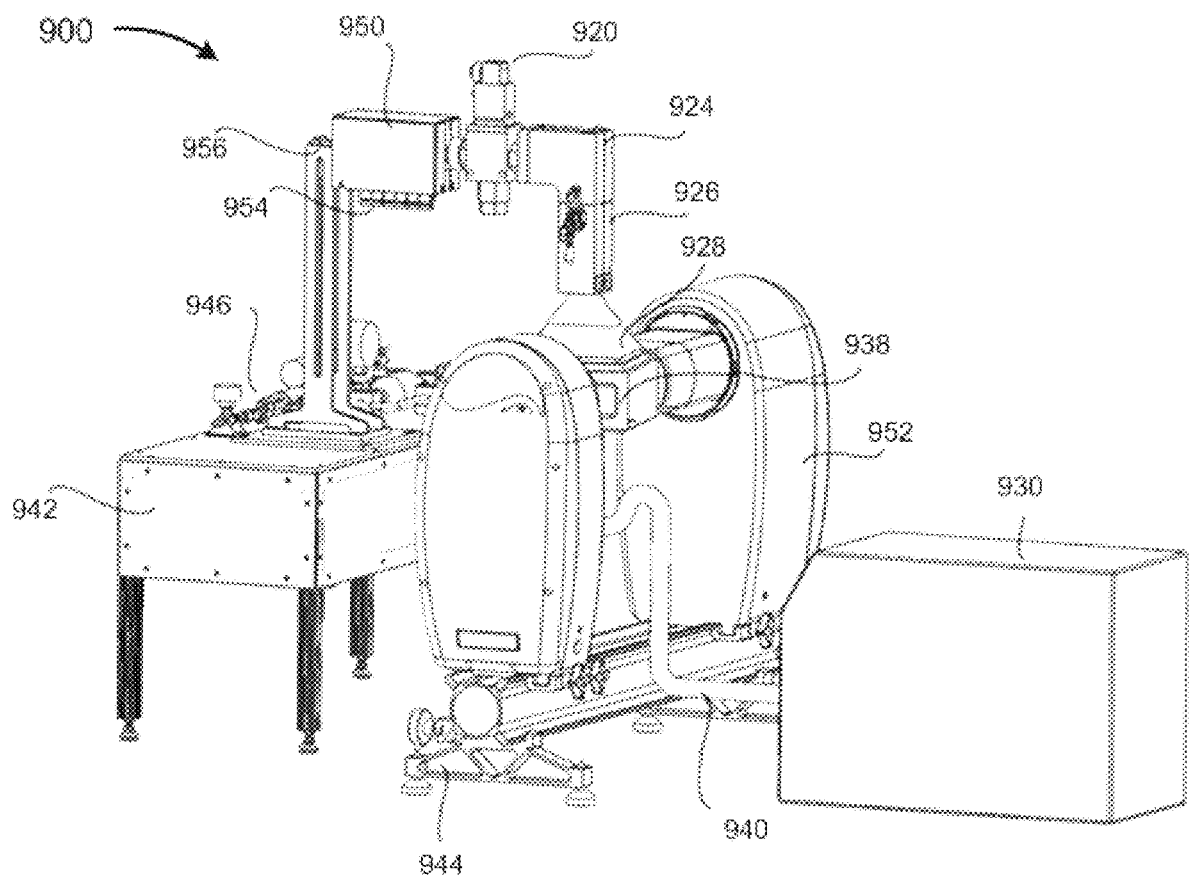

FIG. 8B is a diagram illustrating the operation of lower lung simulator assembly 800. As illustrated in FIG. 8B, lower lung simulator assembly 800 includes biofilm 858. Biofilm 858 is an example of biofilm 758; however, biofilm 858 may include alternative configurations and methods of operation. In this example, third bronchiole generation 856 directs third generation particles to biofilm 858 rather than directly to a lung simulator output. In some examples, biofilm 858 is comprised of cavity lining. Therefore, biofilm 858 may configured to simulate the biological conditions present in the lower lung. Third generation particles 827 interact with biological components included in biofilm 858. This interaction allows biofilm 858 to be used to simulate treatment of respiratory diseases. Biofilm 858 may be used to study the effects of airborne pollutants on the lungs. Biofilm 858 may be used to study viral infections within the lungs. Biofilm 858 may be used to study bacterial infections within the lungs.

FIGS. 9A, 9B, 9C, and 9D respectively show side, rear, top, and oblique views of an embodiment of a lung system simulator as described herein, said embodiment comprising an aerosol generator, human airway simulator, and breath simulator 930.

In some embodiments, an aerosol generator comprises a gas delivery unit 934, pressure control unit 946, and actuator 936.

An electronically controlled actuator 936 is configured to cause a timed activation of release of a pressurized gas release from gas delivery unit 934. The pressurized gas that is released enters the aerosol generator 1000 (FIG. 10) then travels down a pressure tube 1066 (FIG. 10) to the aerosol shaft and aerosol nozzle 1064 (FIG. 10), which is supported by a support arm. Pressurized gas serves as a propellant to drive the solution through an aerosol nozzle 1064, which may contain jet ports or an ultrasonic aerosol head to generate the aerosol.

In some embodiments, the aerosol generator 1000 (FIG. 10) is configured to aerosolize a formulated medicament. Suitable drug formulations suitable for use include, but are not limited to, solutions or suspensions.

In the other position, a valve allows for the flow of outside air to enter mouth simulator 920 section of the device. Vacuum pressure generated by the breath simulator that matches the vacuum pressure and flow dynamics of the human lung generates the vacuum required to pull the aerosol through the human airway simulator (i.e. the mouth simulator 920 together with the trachea simulator 926), lung simulator 928, and sampling tube 954.

Mouth simulator 920 and throat simulator 924 simulate the internal dimensions and geometry of a human oral cavity and oral pharynx. Trachea simulator 926 simulates the internal dimensions and geometry of a human trachea. Lung simulator 928 mimics tracheal-bronchial intersection and subsequent divisions or generations of the pulmonary airway. Mouth simulator 920, trachea simulator 924, and lung simulator 928 are heated in order to match physiological temperature of about 99 degrees Fahrenheit. Mouth simulator 920, trachea simulator 924, and lung simulator 928 are also coated with a hygroscopic smooth material, such as a hydrogel, that maintains the assembly at physiological humidity of 97% to supersaturated. Lung simulator 928 is configured to match the flow length, transit time, flow velocity, temperature, and humidity of the human lung. This allows for the aerosol generated by the aerosol generator to be subjected to those physiological conditions before being analyzed by particle size analyzer 952. Particle size analyzer 952 may be supported by particle analyzer base unit 944. In some embodiments, particle size analyzer 952 utilizes laser diffraction to measure the size and distribution of aerosol particles. The laser is transmitted through sampling window 938 of lung simulator 928.

In some embodiments, once the aerosol passes through the airway simulator it passes through vacuum tube 942 for collection. In some embodiments, a collection filter, pad, or impactor plate allows for the aerosol composition to be further analyzed by methods such as liquid chromatography, gas chromatography and other analytical methods. In some embodiments, after collection, the aerosol is filtered so to collect any residual drug components of the formulation for safe disposal and isolation.

FIG. 10 shows a detailed view of an embodiment of an aerosol generator 1000 and mouth simulator 1020 such as, for example, included in the embodiment of the device shown in FIGS. 9A-9D. The aerosol generator comprises one or more of aerosol shaft 1066, formula reservoir 1062, aerosol nozzle 1064, heater segments 1060, thermocouple and heater housing 1068, thermocouple and heater control units 1070, and clean air bypass 1058.

In some embodiments, the aerosol nozzle assembly includes heated aerosol nozzle 1064. Aerosol nozzle 1064 is set into an aspiration tube (shown surrounded by heater segments 1060) which is comprised of a series of 1 cm segments that are heated with individual controls. Each heater segment 1060 is configured to be controlled between temperatures of 25 degrees Celsius and 300 degrees Celsius.

In some embodiments, heater segments 1060 are kept at separate temperatures. The temperature is monitored by individual thermocouple and heater housings 1068 attached to each heater segment 1060. Heater segments 1060 are heated by heater elements placed on the external surface of the cylindrical heater segments 1060, such that the internal surface of the cylindrical segments that comprised the aspiration tube is heated by the conduction or conveyance of heat or thermal energy through the cylinder wall. As a result, generated aerosol does not come into contact directly with the heater elements.

One or more solutions to be aerosolized are injected into aerosol shaft 1066 at precise volumes through the use of a flow control valve or an auto injector such as a syringe pump. Pressurized gas serves as a propellant to drive the solution through the aerosol nozzle 1064, which may contain jet ports or an ultrasonic aerosol head to generate the aerosol. The exit port of the aspiration tube engages a control valve, which in one position directs the flow from the aspiration tube to mouth simulator 1020 and throat simulator sections of the human airway simulator.

FIG. 11 shows a top detail view of embodiments of the control platform and embodiments of components found thereon. Gas delivery unit 1134 comprises a gas canister and a first control valve, wherein the first control valve attaches to and allows for filling of the compressed gas canister. In some embodiments, gas delivery unit 1134 comprises a second control valve on the other side of the gas canister which is also controlled by a valve assembly that is also mated to pressure control unit 1146 that is configured to control the gas pressure within gas delivery unit 1134. In some embodiments, pressure control unit 1146 includes a pressure valve 1172.

In some embodiments, gas flow through the first valve is activated by actuator 1136. In some embodiments, pressure gauge 1194 is positioned between gas delivery unit 1134 and pressure control unit 1146.

A top detailed view of an embodiment of an aerosol generator as shown in, for example, FIG. 10 is also shown including aerosol nozzle 1164, segmentally heated aspiration tube 1160, thermocouples 1170, liquid formation reservoir 1162, and aerosol shaft 1166.

FIG. 12 shows a detailed view of the front of control element panel 1204. In some embodiments, control element panel 1204 comprises a plurality of heater segments 1202, a control panel for the heated aerosol nozzle 1298, and a user controlled activation button 1296.

EXAMPLES

Shown in FIG. 13 is a data report from the particle analyzer for an aerosol generated by the assembly with 10 heater segments in the aspiration tube set each at 50 degrees Celsius. This sample is taken before the particle passes through the airway simulator assembly.

Shown in FIG. 14, which is a data report from the particle analyzer for an aerosol generated by the assembly with 10 heater segments in the aspiration tube set each at 150 degrees Celsius. Note that the thermal modulation of the generated aerosol results in a narrowly distributed small particle size when compared with the data shown in FIG. 8. This sample is taken before the particle passes through the airway simulator assembly. Precisely controlling the particle size to a smaller size allows for the particle to undergo hygroscopic growth and reach optimal size for pulmonary delivery as it passes to the deep lung, optimizing the drug delivery.

It should be understood to one skilled in that the components presented herein may be manufactured from metal, plastic, glass, ceramic, or some other material, including combinations thereof, having desirable properties. Selection of materials is based on a variety of factors. Some of these may factors include manufacturing method, cost, ability to be cleaned and/or sterilized, or some other factor. Some embodiments may include seals between mating components configured to minimize pressures leaks. The shapes and dimensions of the seals may be configured for different embodiments.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An apparatus that simulates a respiratory system, comprising:
    a simulated oral cavity capable of receiving an aerosol;
    a simulated oropharynx cavity capable of receiving the aerosol from the simulated oral cavity;
    a simulated trachea airway cavity capable of receiving the aerosol from the simulated oropharynx cavity;
    a simulated lung airway system comprising a plurality of bronchial airway generations, wherein the simulated lung airway system comprises:
        a simulated upper lung airway system, the aerosol to be drawn from the simulated trachea airway cavity through the simulated upper lung airway system;
        a simulated lower lung airway system, the simulated lower lung airway system including the final airway generation, this simulated lower lung airway system receiving the aerosol from the simulated upper lung airway system;
        the simulated lung airway system capable of receiving the aerosol form the simulated trachea airway cavity, the plurality of bronchial airway generations including a final airway generation;
    a cavity lining coating at least one of the simulated oral cavity, the simulated oropharynx cavity, the simulated trachea airway cavity, and the simulated lung airway system; and
    a breath simulator interface in fluid communication with the final airway generation, a breath simulator coupled to the breath simulator interface to draw the aerosol through the simulated oropharynx cavity, the simulated trachea airway cavity, and the simulated lung airway system;
    wherein the simulated lower lung airway system further comprises:
    a first perforated plate including a first plurality of passageways through the first perforated plate that simulate a first lower lung bronchial airway generation corresponding to the e first perforated plate, the first plurality of passageways with e sized that simulate the first lower lung bronchial airway generation;
    a second perforated plate including a second plurality of passageways through the second perforated plate that simulate a second lower lung bronchial airway generation corresponding to the second.

2. The apparatus of claim 1, wherein the cavity lining comprises a growth medium suitable for growing microorganisms.

3. The apparatus of claim 1, wherein the aerosol is drawn through the first plurality of passageways before being drawn through the second plurality of passageways, second passageways of the second plurality of passageways being offset from first passageways of the first plurality of passageways.

4. The apparatus of claim 3, wherein a first cross-sectional area of each first passageway of the first plurality of passageways is greater than a second cross-sectional area of each second passageway of the second plurality of passageways.

5. The apparatus of claim 4, further comprising an air gap between the first perforated plate and the second perforated plate, the air gap forming a space between exits of the first passageways and entrances of each of the second passageways.

6. A modular apparatus that simulates a respiratory system, comprising:
    an oral cavity module including an oral cavity capable of drawing a flow from outside the oral cavity to simulate an inhalation of a breath, the oral cavity having a first shape and first dimensions that simulate at least a first portion of the oral cavity;
    an oropharynx module including an oropharynx cavity capable of receiving the flow from the oral cavity module, the oropharynx module configured to be detachable from the oral cavity module, the oropharynx cavity having a second shape and second dimensions that simulate at least a second portion of the oral cavity and a pharyngeal cavity;
    a trachea module including a trachea airway cavity capable of receiving the flow from the oropharynx cavity, the trachea module configured to be detachable from the oropharynx module, the trachea airway cavity having a third shape and third dimensions that simulate the trachea airway cavity;
    an upper lung airway module including a first plurality of bronchial airway generation cavities capable of receiving, and of dividing with each successive generation, the flow from the trachea airway cavity, the upper lung airway module configured to be detachable from the trachea module;
    a lower lung airway module including a second plurality of bronchial airway generation cavities capable of receiving, and of dividing with each successive generation, divided flows from the upper lung airway module, the lower lung airway module configured to be detachable from the upper lung airway module;
    a sampling cavity module capable of receiving flows from the lower lung airway module, the sampling cavity module including a breath simulator interface capable of communicating a pressure with a strength and a duration capable of simulating an inhalation cycle.

7. The modular apparatus of claim 6, wherein the sampling cavity module has sampling windows for enabling an optical particle size analyzer to measure an aerosol droplet size in the flows from the lower lung airway module.

8. The modular apparatus of claim 7, wherein the sampling cavity module includes a humidity sensor port.

9. The modular apparatus of claim 6, further comprising:
    at least one temperature-controlled heating element capable of maintaining an inner surface temperature of at least one of the oral cavity module, the oropharynx module, and the trachea module to simulate a temperature of at least one of the oral cavity, the pharyngeal cavity, and the trachea airway cavity.

10. The modular apparatus of claim 9, further comprising: a cavity lining on an inner surface of at least one of the oral cavity module, the oropharynx module, and the trachea module capable of simulating a wetness of at least one of the oral cavity, the pharyngeal cavity, and the trachea airway cavity.

11. The modular apparatus of claim 6, further comprising: at least one temperature-controlled heating element associated with the upper lung airway module and capable of maintaining inner surfaces of the first plurality of bronchial airway generation cavities at a temperature that simulates a temperature of lung.

12. The modular apparatus of claim 6, further comprising: a cavity lining on inner surfaces of the first plurality of bronchial airway generation cavities and capable of simulating a wetness of a lung.

13. The modular apparatus of claim 6, further comprising: at least one temperature-controlled heating element associated with the lower lung airway module and capable of maintaining inner surfaces of the first plurality of bronchial airway generation cavities at a temperature that simulates a temperature of a lung.

14. The modular apparatus of claim 6, further comprising: a cavity lining on inner surfaces of bronchial airway generation cavities of the second plurality of bronchial airway generation cavities and capable of simulating a wetness of a lung.

15. A method of operating a modular respiratory system simulator, comprising:
    drawing a flow into an oral cavity of an oral cavity module in a manner that simulates an inhalation of a breath, the oral cavity having a first shape and first dimensions that simulate at least a first portion of the oral cavity;
    receiving the flow from the oral cavity module into an oropharynx cavity of an oropharynx module the oropharynx module configured to be detachable from the oral cavity module, into the oropharynx module, the oropharynx cavity having a second shape and second dimensions that simulate at least a second portion of the oral cavity and a pharyngeal cavity;
    receiving the flow from the oropharynx module into a trachea airway cavity of a trachea module, the trachea module configured to be detachable from the oropharynx module, the trachea airway cavity having a third shape and third dimensions that simulate a trachea cavity;
    receiving and dividing the flow from the trachea module into an upper lung airway module, the upper lung airway module including a first plurality of bronchial airway generation cavities capable of receiving, and of dividing with each successive generation, the flow from the trachea airway cavity, the upper lung airway module configured to be detachable from the trachea module;
    receiving and further dividing divided flows from the upper lung airway module in a lower lung airway module, the lower lung airway module including at least a second plurality of bronchial airway generation cavities capable of receiving, and of dividing with each successive generation, divided flows from the upper lung airway module, the lower lung airway module configured to be detachable from the upper lung airway module;
    receiving the divided flows from the lower lung airway module in a sampling cavity of a sampling cavity module, the sampling cavity module capable of receiving the divided flows from the lower lung airway module, the sampling cavity module including a breath simulator interface capable of communicating a pressure with a strength and a duration capable of simulating an inhalation cycle.

16. The method of claim 15, the oral cavity wherein drawing the flow into, receiving the flow from the oral cavity module into the oropharynx module, receiving the flow from the oropharynx module into the trachea airway cavity, receiving and dividing the flow from the trachea module into the upper lung airway module, and/or receiving and further dividing divided flows from the upper lung airway module in the lower lung airway module comprises receiving a flow within a cavity that includes a lining that simulates a wetness of the oral cavity, the pharyngeal cavity, the trachea, and/or the lungs.

17. An apparatus that simulates a respiratory system, comprising:
    a simulated oral cavity capable of receiving an aerosol;
    a simulated oropharynx cavity capable of receiving the aerosol from the simulated oral cavity;
    a simulated trachea airway cavity capable of receiving the aerosol from the simulated oropharynx cavity;
    a simulated lung airway system comprising a plurality of bronchial airway generations, the simulated lung airway system capable of receiving the aerosol from the simulated trachea airway cavity, the plurality of bronchial airway generations including a final airway generation, the simulated lung airway system including:
        a first perforated plate having a first plurality of passageways that simulate a first lower lung bronchial airway generation, the first plurality of passageways having sizes that simulate the first lower lung bronchial airway generation; and
        a second perforated plate having a second plurality of passageways that simulate a second lower lung bronchial airway generation, the second plurality of passageways having sizes that simulate the second lower lung bronchial airway generation; and
    a breath simulator interface in fluid communication with the final airway generation, a breath simulator coupled to the breath simulator interface to draw the aerosol through the simulated oropharynx cavity, the simulated trachea airway cavity, and the simulated lung airway system.

18. The apparatus of claim 17, wherein the aerosol is drawn through the first plurality of passageways before being drawn through the second plurality of passageways, second passageways of the second plurality of passageways being offset from first passageways of the first plurality of passageways.

19. The apparatus of claim 18, wherein a first cross-sectional area of each first passageway of the first plurality of passageways is greater than a second cross-sectional area of each second passageway of the second plurality of passageways.

20. The apparatus of claim 17, further comprising an air gap between the first perforated plate and the second perforated plate, the air gap forming a space between exits of the first passageways and entrances of each of the second passageways.

* * * * *